(12) United States Patent　　(10) Patent No.:　　US 9,176,897 B2
Kurimoto et al.　　　　　　　　(45) Date of Patent:　　　Nov. 3, 2015

(54) WRITING AREA SECURITY SYSTEM

(75) Inventors: Shinji Kurimoto, Kyoto (JP); Masashi Seiki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1004 days.

(21) Appl. No.: 12/676,513

(22) PCT Filed: Sep. 4, 2007

(86) PCT No.: PCT/JP2007/067559
§ 371 (c)(1),
(2), (4) Date: Jul. 19, 2010

(87) PCT Pub. No.: WO2009/031244
PCT Pub. Date: Mar. 12, 2009

(65) Prior Publication Data
US 2010/0287380 A1　　Nov. 11, 2010

(51) Int. Cl.
*G06F 12/00* (2006.01)
*G06F 12/14* (2006.01)
*G06F 21/10* (2013.01)
*H04L 9/08* (2006.01)

(52) U.S. Cl.
CPC ............ *G06F 12/1441* (2013.01); *G06F 21/10* (2013.01); *H04L 9/0891* (2013.01); *H04L 9/0894* (2013.01); *G06F 2212/2022* (2013.01); *H04L 2209/603* (2013.01); *H04L 2209/80* (2013.01)

(58) Field of Classification Search
CPC ............ G06F 21/10; G06F 2221/2107; G06F 3/0644; G06F 9/5077; G06F 3/0607; G06F 3/067; G06F 12/023; G06F 12/1441; G06F 2212/2022; G11B 20/00086; G11B 20/0021; H04L 9/08; H04L 9/0891; H04L 9/0894; H04L 2209/80; H04L 2209/603
USPC ............. 713/193; 726/2–6, 27; 711/152–153, 711/173
See application file for complete search history.

(56) References Cited

U.S. PATENT DOCUMENTS

| 5,148,481 | A | * | 9/1992 | Abraham et al. | ............... 380/46 |
| 6,005,942 | A | | 12/1999 | Chan et al. | |
| 6,032,237 | A | | 2/2000 | Inoue et al. | |
| 7,117,364 | B1 | | 10/2006 | Hepper et al. | |
| 7,239,706 | B1 | * | 7/2007 | Wilhelm et al. | ............... 380/240 |

(Continued)

FOREIGN PATENT DOCUMENTS

| EP | 1 492 105 | 12/2004 |
| EP | 1 688 816 | 8/2006 |

(Continued)

OTHER PUBLICATIONS

International Search Report for PCT/JP2007/067559, mailed Jun. 10, 2008.

(Continued)

*Primary Examiner* — Matthew Smithers
(74) *Attorney, Agent, or Firm* — Nixon & Vanderhye P.C.

(57) ABSTRACT

A writing area security system (10) includes a CPU (34), a flash memory (64), and a memory controller (62). The memory controller (62), when receiving a read command of data stored in the flash memory (64) from the CPU (34), performs a parity check on the data. The memory controller (62) outputs the data to the CPU (34) only when the parity of the read data is correct.

23 Claims, 28 Drawing Sheets

(56) References Cited

U.S. PATENT DOCUMENTS

| | | |
|---|---|---|
| 7,324,974 B1* | 1/2008 | Cho et al. .................. 705/51 |
| 7,469,837 B2 | 12/2008 | Mizushima |
| 7,523,280 B2 | 4/2009 | Ooshima et al. |
| 7,559,090 B2* | 7/2009 | Takagi et al. .................. 726/27 |
| 7,623,659 B2* | 11/2009 | Huang et al. .................. 380/44 |
| 7,761,780 B2* | 7/2010 | Kanai .................. 714/805 |
| 7,899,971 B2* | 3/2011 | Mori et al. .................. 711/4 |
| 2002/0165026 A1* | 11/2002 | Perkins et al. .................. 463/42 |
| 2002/0175840 A1 | 11/2002 | Kugai |
| 2002/0199074 A1* | 12/2002 | Kuo .................. 711/163 |
| 2004/0073841 A1* | 4/2004 | Toros et al. .................. 714/30 |
| 2005/0086471 A1* | 4/2005 | Spencer .................. 713/165 |
| 2005/0122790 A1* | 6/2005 | Ueno et al. .................. 365/189.05 |
| 2005/0192099 A1* | 9/2005 | Nguyen et al. .................. 463/42 |
| 2005/0197099 A1 | 9/2005 | Nehushtan |
| 2005/0249510 A1* | 11/2005 | Ito et al. .................. 399/12 |
| 2006/0027121 A1* | 2/2006 | Koekemoer et al. .................. 102/301 |
| 2006/0107072 A1 | 5/2006 | Umezu et al. |
| 2006/0109730 A1* | 5/2006 | Mito .................. 365/230.01 |
| 2006/0143475 A1 | 6/2006 | Herbert et al. |
| 2006/0188098 A1* | 8/2006 | Kumagai et al. .................. 380/239 |
| 2007/0050642 A1* | 3/2007 | Flynn et al. .................. 713/192 |
| 2007/0067644 A1* | 3/2007 | Flynn et al. .................. 713/189 |
| 2007/0124557 A1 | 5/2007 | Kanai |
| 2007/0124811 A1 | 5/2007 | Dellow et al. |
| 2007/0226403 A1* | 9/2007 | Son et al. .................. 711/103 |
| 2007/0257813 A1* | 11/2007 | Vaswani et al. .................. 340/870.02 |
| 2007/0266214 A1* | 11/2007 | Ohyama .................. 711/163 |
| 2007/0294337 A1* | 12/2007 | Gaos et al. .................. 709/203 |
| 2008/0005567 A1 | 1/2008 | Johnson |
| 2008/0019521 A1 | 1/2008 | Ahn |
| 2008/0095368 A1* | 4/2008 | Iida et al. .................. 380/259 |
| 2009/0081964 A1* | 3/2009 | Buznach .................. 455/90.1 |
| 2009/0113536 A1* | 4/2009 | Zhang et al. .................. 726/12 |
| 2010/0131747 A1* | 5/2010 | Kurimoto et al. .................. 713/2 |
| 2010/0205434 A1* | 8/2010 | Kurimoto .................. 713/168 |

FOREIGN PATENT DOCUMENTS

| | | |
|---|---|---|
| EP | 1 826 701 | 8/2007 |
| JP | 1-182971 | 7/1989 |
| JP | 1-182971 A | 7/1989 |
| JP | 3-126145 | 5/1991 |
| JP | 3-126145 A | 5/1991 |
| JP | 5-274492 | 10/1993 |
| JP | 2002-281181 | 9/2002 |
| JP | 2004-13560 A | 1/2004 |
| JP | 2006-139884 | 6/2006 |
| JP | 2006-146505 A | 6/2006 |
| JP | 2006-338311 | 12/2006 |
| JP | 2007-4522 A | 1/2007 |
| JP | 2007-148770 | 6/2007 |
| JP | 2007-148770 A | 6/2007 |
| JP | 2007-206902 | 8/2007 |
| JP | 2007206902 A * | 8/2007 |
| WO | 2004/046934 | 6/2004 |
| WO | WO 2007/087432 A2 | 8/2007 |

OTHER PUBLICATIONS

Communication mailed May 15, 2012 in European Appln. No. 07 806 992.9 (5 pages).

Office Action Mailed Feb. 17, 2012 in U.S. Appl. No. 12/676,496 (27 pages).

Notice of Reasons for Rejection mailed Oct. 2, 2012 in Japanese Application No. 2009-531082, with English translation.

Office Action mailed May 8, 2013 in co-pending U.S. Appl. No. 12/676,496.

Extended European Search Report mailed May 8, 2014 in European Application No. 13198509.5 (8 pp.).

* cited by examiner

FIG. 1
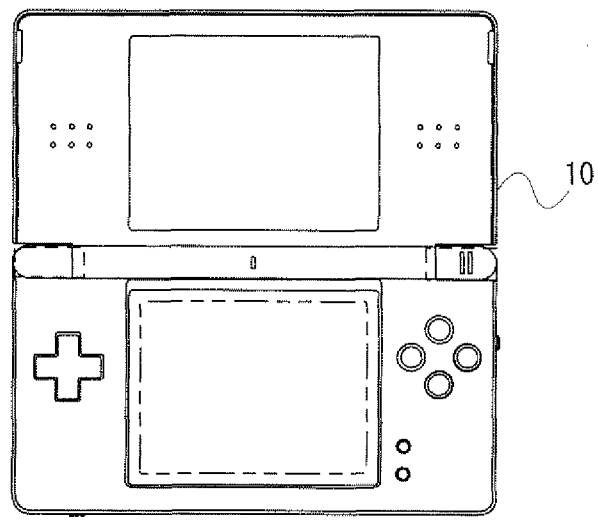
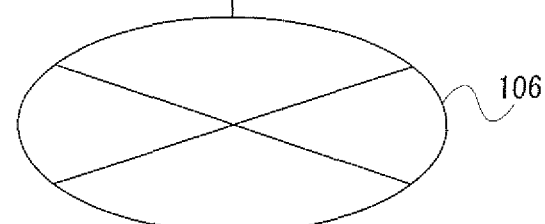
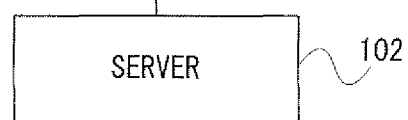

WRITING AREA SECURITY SYSTEM

This application is the U.S. national phase of International Application No. PCT/JP2007/067559 filed 4 Sep. 2007, the entire contents of which is hereby incorporated by reference.

TECHNICAL FIELD

The technology presented herein relates to a writing area security system. More specifically, the present technology relates to a writing area security system for protecting a writing area from unauthorized use. Furthermore, the present technology relates to a memory controller and a security method which are utilized in the writing area security system.

PRIOR ART AND SUMMARY

One example of an art of downloading data from a server to an IC card of a portable terminal is disclosed in a Japanese Patent Laying-open No. 2002-281181 (patent document 1) laid-open on Sep. 27, 2002. More specifically, in the art of the patent document 1, the IC card has file structure so as to be protected by an access key for each file, and a readable-and-writable key by which an access is made to the IC card to read the content of the file and to rewrite the same is managed by only a host server. Additions and changes to the content written in the IC card can be performed only by a write instruction from the host server after an online connection is made with the host server through the portable terminal. That is, only at a time that the readable-and-writable key which is sent with the instruction added, that it is checked on the side of the IC card, and that the check is correct, the file is made accessible. Furthermore, by the readable-and-writable key belonging to the portable terminal, the data written to the IC card is read.

In the art of the Patent Document 1, write protection with respect to the IC card is merely performed for each file by the readable-and-writable key, and moreover, there is no idea of separating between an area where protection can be performed by the readable-and-writable key and the other area in the Patent Document 1. Thus, if the protection is broken, large quantities of data can be written to the IC card. Moreover, there is no mechanism for confirming whether or not the written data is authorized data, and thus, even if the data is data illegally written, this may be utilized in the portable terminal.

SUMMARY OF THE INVENTION

Therefore, it is a primary feature of the present technology to provide a novel writing area security system, and a memory controller and a security method which are utilized therefor.

Another object of the present technology is to provide a writing area security system, and a memory controller and a security method which are utilized therefor capable of, even if unintended data is written to a writing area, preventing the data from being illegally used.

The present technology employs following features in order to solve the above-described problems. It should be noted that reference numerals and the supplements inside the parentheses show one example of a corresponding relationship with the embodiments described later for easy understanding of the present technology, and do not limit the present technology.

A first example embodiment is a writing area security system including a storing means having a predetermined writing area, a controlling means controlling writing to and reading from the storing means, and a host to be connected to the controlling means. The host includes an instruction transmitting means for transmitting a reading instruction of data stored in the predetermined writing area to the controlling means. The controlling means includes a format determining means for determining whether or not the data read from the predetermined writing area in response to the reading instruction is in a predetermined format and an output means for outputting the data to the host only when the format determining means determines that the data is in the predetermined format.

In the first embodiment, a writing area security system (10, 100) includes a storing means (64), a controlling means (62), and a host (34). In the storing means, a predetermined writing area (206) is provided. The controlling means controls writing to and reading from the storing means. The host is a host computer which entirely controls the system, such as a host CPU, a host processor, or the like, and can be connected to the controlling means so as to control the controlling means. The host includes an instruction transmitting means (S507) to transmit a reading instruction of data stored in the predetermined writing area to the controlling means. The controlling means includes a format determining means (S621, S623) to determine whether or not the data read from the predetermined writing area in response to the reading instruction is in a predetermined format. The controlling means further includes an output means (S625) to output the data to the host only when the format determining means determines that the data is in the predetermined format.

According to the first embodiment, it is determined whether or not the data read from the predetermined writing area is in the predetermined format, and the data being in the predetermined format is output to the host. Accordingly, even if data not being in the predetermined format is written to the predetermined writing area, the data is not output to the host, capable of preventing unintended data from being illegally used.

A second example embodiment is a writing area security system, and the storing means has a first area and a second area, the controlling means further includes a first writing means for writing data to the first area in a writable mode to which a transition is made in response to a first transition command, and the format determining means determines only with respect to the data read from the second area as the predetermined writing area whether or not the data is in the predetermined format.

In the second embodiment, the storing means is provided with a first area (204) and a second area (206). The controlling means further includes a first writing means (S83, S267) to write data to the first area in a writable mode to which a transition is made in response to a first transition command. Additionally, the format determining means determines only with respect to the data read from the second area as the predetermined writing area whether or not the data is in the predetermined format.

According to the second embodiment, it is possible to perform protection according to the format determination only on the predetermined writing area out of the storing means, and it is possible to perform writing allowing protection according to a transition to the writable mode on the other area. Thus, it is possible to perform appropriate writing by using different writing areas for different writing uses.

A third example embodiment is a writing area security system, and the controlling means further includes an address determining means for determining whether or not a reading address designated from the host is within an accessible area out of the predetermined writing area, and when the address determining means determines that the reading address is within the area, the format determining means determines whether or not the read data is in the predetermined format.

In the third embodiment, the controlling means further includes an address determining means (S619) to determine whether or not a reading address designated from the host is within an accessible area out of the predetermined writing area. When it is determined that the reading address is within the accessible area, it is determined whether or not the read data is in the predetermined format.

According to the third embodiment, it is possible to determine whether the predetermined format or not only with respect to the data to which the reading designation is appropriately made.

A fourth example embodiment is a writing area security system, and the format determining means makes a determination by a parity check of the read data.

In the fourth embodiment, by the parity check of the read data, whether the predetermined format or not is determined. Thus, it is possible to easily check authentication of the data.

A fifth example embodiment is a writing area security system, and the controlling means makes a transition to an illegal mode when the format determining means determines that the read data is not in the predetermined format.

In the fifth embodiment, when it is determined that the read data is not in the predetermined format, the controlling means makes a transition to an illegal mode. Thus, it is possible to prevent data reading from being performed from the predetermined writing area and prevent the data which is illegally written from being used.

A sixth example embodiment is a writing area security system, and the host includes a writing data generating means for generating data to which a parity bit is added, and the controlling means includes a second writing means for writing the data generated by the writing data generating means in the predetermined writing area.

In the sixth embodiment, the host includes a writing data generating means (S403) to generate data to which a parity bit is added. For example, the first seven bits of each byte is data to be written to the predetermined writing area, and parity of the first seven bits is added to the last bit. The controlling means further includes a second writing means (S409) to write the generated data with parity in the predetermined writing area.

According to the sixth embodiment, at a time of writing to the predetermined writing area, after the writing data is converted to data to which the parity bit is added, it can be written to the predetermined area. Thus, at a time of reading from the predetermined writing area, the data is determined to be authenticated data having the predetermined format, and then output to the host.

A seventh example embodiment is a writing area security system, and the storing means stores boundary data between the first area and the second area.

In the seventh embodiment, in the storing means, the boundary data between the first area and the second area is stored. While grasping the first area and the second area, the controlling means can access the same by reference to the boundary data of the first area and the boundary data of the second area.

An eighth example embodiment is a writing area security system, and includes a server and an information processing apparatus for downloading data from the server. The information processing apparatus includes a storing means, a controlling means and a host. The server includes a transition command transmitting means for transmitting to the information processing apparatus the first transition command to cause the controlling means to make a transition to a writable mode as to the first area of the storing means to the information processing apparatus, and a data transmitting means for transmitting data to be downloaded.

In the eighth embodiment, a system (100) includes a server (102) and an information processing apparatus (10). The information processing apparatus includes the above-described storing means, controlling means and host, and downloads data from the server. The location where the downloaded data is to be written is a first area of the storing means. That is, the first writing means writes the data to the first area in the writable mode to which a transition is made in response to the first transition command. A server includes a transition command transmitting means (S33, S323) to transmit to the information processing apparatus the first transition command to cause the controlling means to make a transition to the writable mode as to the first area. The server further includes a data transmitting means (S67, S341) to transmit data to be downloaded to the information processing apparatus.

According to the eighth embodiment, writing of the data allowing stepwise protection by the transition to the writable mode in response to the first transition command from the server can be performed on the first area while protection by the determination of the format can be performed on the second area.

A ninth embodiment is a writing area security system, and the server further includes an encrypting means for encrypting the first transition command. The transition command transmitting means transmits the first transition command encrypted by the encrypting means, and the controlling means further includes a decrypting means for decrypting the encrypted first transition command.

In the ninth embodiment, the server further includes an encrypting means (S31) to encrypt the first transition command. The encrypted first transition command is transmitted by the transition command transmitting means. The controlling means further includes a decrypting means (S37, S227) to decrypt the encrypted first transition command.

According to the ninth embodiment, as to the writing to the first area, the first transition command can be encrypted and transmitted, capable of heightening the degree of security with respect to the mode transition.

A tenth example embodiment is a writing area security system, and the first transition command includes an address designated for writing the data to be downloaded. The controlling means further includes write-enabling means for making only the designated address writable out of the first area when a transition is made to the writable mode as to the first area in response to the first transition command.

In the tenth embodiment, an address for writing data can be designated in the first transition command. The controlling means further includes a write-enabling means (S45, S237) to make only the designated address writable out of the first area.

According to the tenth embodiment, by the first transition command, it is possible to make a transition to the writable mode and make only the address designated by the command writable.

An eleventh example embodiment is a writing area security system, and the write-enabling means makes a fixed range from the designated address out of the first area writable.

In the eleventh embodiment, by the first transition command, it is possible to make a transition to the writable mode and make a fixed range from the designated address writable.

A twelfth example embodiment is a writing area security system, and the controlling means decrypts the encrypted first transition command in a secure mode being higher in a degree of security than usual to which a transition has been made direct before the writable mode as to the first area.

In the twelfth embodiment, a secure mode being higher in a degree of security than usual is provided directly before the writable mode, and in the secure mode, decryption of the encrypted first transition command is performed.

According to the twelfth embodiment, the decryption of the first transition command can be performed in the secure mode, capable of heightening the degree of security.

A thirteenth example embodiment is a writing area security system, and the server stores a first key for encrypting the first transition command, and a second key different from the first key for encrypting the data to be downloaded. The encrypting means encrypts the first transition command by utilizing the first key. The data transmitting means transmits the data to be downloaded encrypted by utilizing the second key. The storing means stores the first key and the second key. The decrypting means decrypts the encrypted first transition command by utilizing the first key. The first writing means decrypts the encrypted data to be downloaded by utilizing the second key in the writable mode as to the first area and writes the same to the first area.

In the thirteenth embodiment, a first key for encrypting the first transition command and a second key different from the first key for encrypting the data to be downloaded are stored in the server and the storing means. That is, the server and the controlling means have a common key (first key) for the first transition command and a common key (second key) for the data to be downloaded. The first transition command which is encrypted with the first key and transmitted by the server is decrypted with the first key by the controlling means, and the controlling means makes a transition to the writable mode by the first transition command. Furthermore, the download data which is encrypted with the second key and transmitted by the server is decrypted with the second key by the controlling means, and written to the storing means in the writable mode.

According to the thirteenth embodiment, it is possible to separately perform protection on the mode transition and the download data, capable of further heightening the degree of security.

A fourteenth example embodiment is a writing area security system, and the server further stores a third key for message digest authentication of the data to be downloaded. The data transmitting means encrypts, by utilizing the second key, the data to be downloaded to which an authentication symbol generated by utilizing the third key is added, and transmits the encrypted data. The storing means further stores the third key. The controlling means decrypts the encrypted data by utilizing the second key in the writable mode as to the first area. The first writing means, when the decrypted data is authenticated by utilizing the third key, writes the data in the first area.

In the fourteenth embodiment, the third key for message digest authentication of the data to be downloaded is stored in the server and the storing means. The server encrypts the data to which the authentication symbol (MIC) generated by utilizing the third key is added with the second key and transmits the same. The controlling means decrypts the encrypted data with the second key in the writable mode. Then, when the decrypted data is authenticated by utilizing the third key, the data is written to the first area.

According to the fourteenth embodiment, it is possible to perform the message digest authentication with respect to the data to be downloaded.

A fifteenth example embodiment is a writing area security system, and the third key is a key obtained by a part of the second key being replaced.

In the fifteenth embodiment, the third key for message digest authentication is a key obtained by a part of the second key for encrypting the data to be downloaded being replaced. Accordingly, if a common part is shared between the second key and the third key, the size of the area for storing the key can be reduced, resulting in reduction in cost.

A sixteenth example embodiment is a writing area security system, and the storing means stores the encrypted first key and second key. The controlling means decrypts the encrypted first key and develops the same in a RAM when a transition to the secure mode is made, and decrypts the encrypted second key and develops the same in the RAM when a transition to the writable mode as to the first area is made.

In the sixteenth embodiment, in the storing means, the first key and the second key are encrypted and stored. When a transition to the secure mode is made, the first key is decrypted and automatically developed in the RAM by the controlling means. When a transition to the writable mode is made, the second key is decrypted and automatically developed in the RAM by the controlling means.

According to the sixteenth embodiment, at a time of the mode transition, the first key or the second key corresponding to the mode can be decrypted and developed in the RAM.

A seventeenth example embodiment is a writing area security system, and the controlling means develops the first key in response to a second transition command for making a transition to the secure mode, and develops the second key in response to the first transition command.

In the seventeenth embodiment, when a mode transition is made in response to the transition command by the controlling means, the first key or the second key is decrypted and developed.

According to the seventeenth embodiment, in response to the transition command, the first key or the second key corresponding to the mode can be decrypted and developed.

An eighteenth example embodiment is a writing area security system, and the host further includes a normal encrypting means for performing an encryption according to an algorithm of a relatively low processing load on the command issued with respect to the controlling means in a normal mode.

In the eighteenth embodiment, it is possible to encrypt the command issued to the controlling means in the normal mode by the normal encrypting means according to an algorithm of a relatively low processing load.

A nineteenth example embodiment is a writing area security system, and the host further includes a writing command issuing means for issuing a writing command to instruct the controlling means to perform writing, and the controlling means writes the data to be downloaded to the first area in response to the writing command in the writable mode as to the first area.

In the nineteenth embodiment, the host includes a writing command issuing means (S73, S143) to issue a writing command to the controlling means. The controlling means performs writing the data in response to the writing command in the writable mode.

According to the nineteenth embodiment, in response to the writing instruction from the host, the data downloaded from the server can be written to the storing means. The data transmission and the data writing are separately processed, capable of heightening the degree of security.

A twentieth example embodiment is a writing area security system, and the storing means stores identification information of the storing means. The information processing apparatus includes an identification information transmitting means for transmitting the identification information stored in the storing means to the server. The server stores a plurality of first keys for encrypting the first transition command, each of which is brought into correspondence with a respective one of the plurality of identification information. The encrypting means encrypts the first transition command by utilizing the first key corresponding to the identification information of the storing means.

In the twentieth embodiment, the storing means stores identification information of the storing means. The identification information is transmitted to the server by an identification information transmitting means (S5, S105). On the other hand, the server stores a plurality of first keys, each of which is brought into correspondence with a respective one of the plurality of identification information. That is, the first key for encrypting the first transition command is prepared for each storing means, and stored in the storing means and the server. The first transition command is encrypted by the encrypting means by utilizing the first key corresponding to the received identification information.

According to the twentieth embodiment, it is possible to encrypt the first transition command by the first key for each storing means, and cause the controlling means to make a transition to the writable mode by the first transition command, capable of heightening the degree of security.

A twenty-first example embodiment is a writing area security system, and the storing means stores identification information of an application program stored in the storing means. The information processing apparatus includes identification information transmitting means for transmitting the identification information stored in the storing means to the server. The server stores a plurality of first keys for encrypting the first transition command, each of which is brought into correspondence with a respective one of the plurality of identification information. The encrypting means encrypts the first transition command by utilizing the first key corresponding to the received identification information of the application program.

In the twenty-first embodiment, the storing means stores identification information of an application program stored in the storing means. The identification information is transmitted to the server by an identification information transmitting means (S105). On the other hand, the server stores a plurality of first keys, each of which is brought into correspondence with a respective one of the plurality of identification information. That is, the first key for encrypting the first transition command is prepared for each application (game), and stored in the storing means and the server. The first transition command is encrypted by the encrypting means by utilizing the first key corresponding to the received identification information.

According to the twenty-first embodiment, it is possible to encrypt the first transition command by the first key for each application and cause the controlling means to make a transition to the writable mode by the first transition command, capable of heightening the degree of security.

A twenty-second example embodiment is a writing area security system, and the storing means and the controlling means are provided to a detachable storage medium.

In the twenty-second embodiment, the storing means and the controlling means are provided to a storage medium (28) being detachable to the system. Accordingly, it is possible to protect the predetermined writing area of the storing means provided to the storage medium according to a determination of the format.

A twenty-third example embodiment is a memory controller utilized in a writing area security system including a storing means having a predetermined writing area and a host, and controlling writing to and reading from the storing means. The memory controller includes a format determining means for determining whether or not data read from the predetermined writing area in response to a reading instruction from the host is in a predetermined format, and an output means for outputting the data to the host only when the format determining means determines that the data is in the predetermined format.

In the twenty-third embodiment, a memory controller (62) is utilized in a writing area security system (10, 100) including a storing means (64) and a host (34). The memory controller controls writing to and reading from the storing means having the predetermined writing area (206). More specifically, the memory controller includes a format determining means (S621, S623) to determine whether or not data read from the predetermined writing area in response to a reading instruction from the host is in a predetermined format. The memory controller further includes an output means (S625) to output the data to the host only when it is determined that the data is in the predetermined format.

According to the twenty-third embodiment, it is possible to implement a writing area security system which is not utilized when unintended data is written as in the above-described first embodiment.

A twenty-fourth example embodiment is a security method in a writing area security system including a storing means having a predetermined writing area, a controlling means for controlling writing to and reading from the storing means, and a host to be connected to the controlling means. The security method includes a step of determining whether or not data read from the predetermined writing area in response to a reading instruction from the host by the controlling means is in a predetermined format, and a step of outputting the data to the host by the controlling means only when it is determined that the data is in the predetermined format.

In the twenty-fourth embodiment, a security method is as to a predetermined writing area (206) in a writing area security system (10, 100) including a storing means (64), a controlling means (62), and a host (34). In the method, the controlling means determines whether or not data read from the predetermined writing area in response to a reading instruction from the host by the controlling means is in a predetermined format (S621, S623). The controlling means outputs the data to the host only when it is determined that the data is in the predetermined format (S625).

According to the twenty-fourth embodiment, it is possible to implement the writing area security system as in the above-described first invention.

According to the present technology, when data is read from the predetermined writing area, whether or not the data is in the predetermined format is determined, and only when the data is in the predetermined format, the data is output to the host. Thus, in a case that unintended data is written to the predetermined writing area, the data is not output to the host. Thus, even if unintended data is written to the predetermined writing area, it is possible to prevent the data from being illegally used.

The above described, features, aspects and advantages of the present technology will become more apparent from the following detailed description of the present technology when taken in conjunction with the accompanying drawings.

BRIEF DESCRIPTION OF THE DRAWINGS

FIG. 1 is an illustrative view showing one embodiment of a security system.

BEST MODE FOR PRACTICING THE INVENTION

Figure 2:
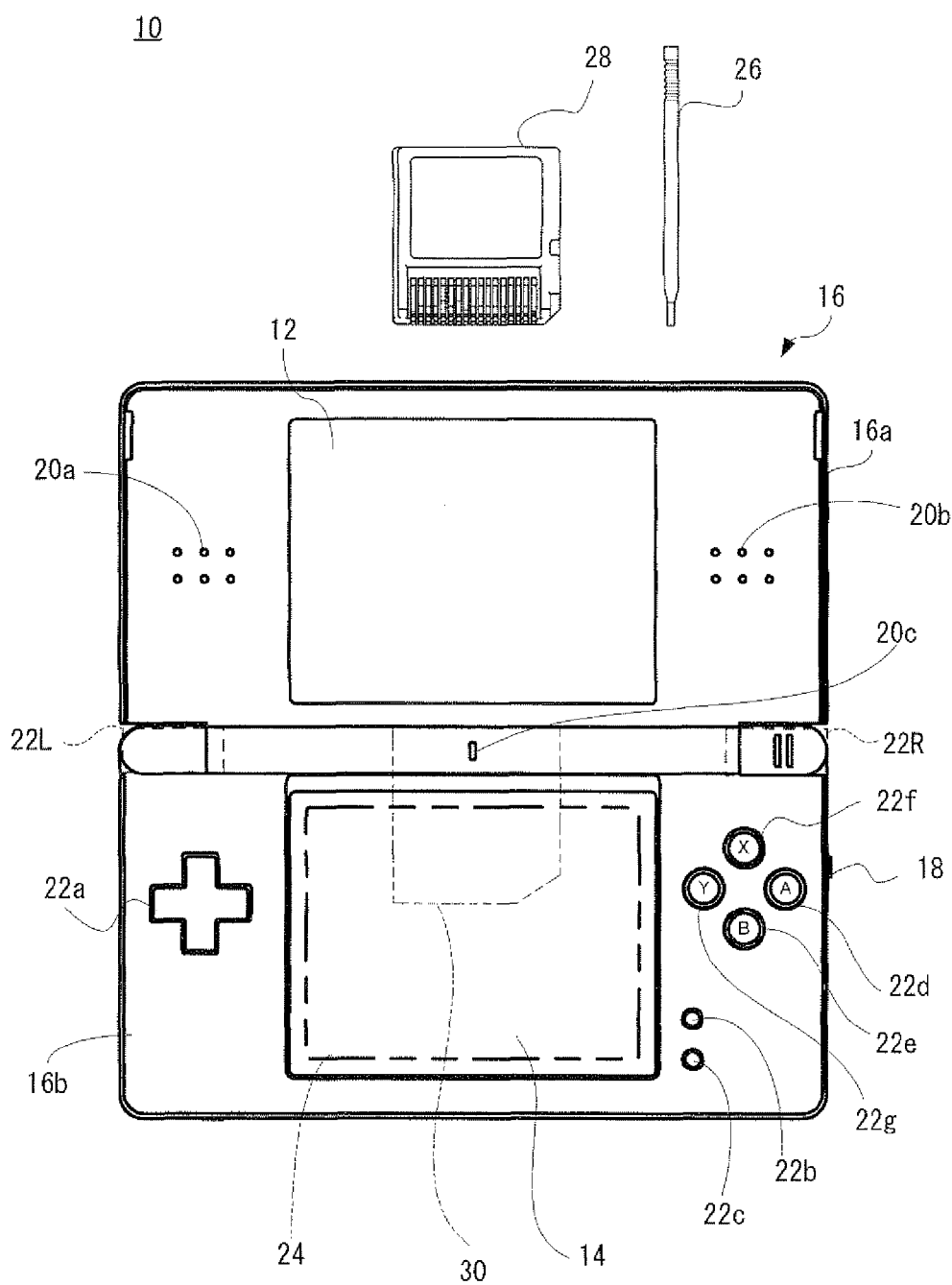
FIG. 2 is an illustrative view showing a game apparatus shown in FIG. 1.

Referring to FIG. 1, a security system (hereinafter referred to as "system") 100 of an embodiment includes an information processing apparatus 10 and a server 102. The information processing apparatus 10 downloads data from the server 102 to store the data in a predetermined memory area. The system 100 of this embodiment is a download security system, and is for preventing the predetermined memory area for writing downloaded data from being utilized by an unauthorized download. Furthermore, the information processing apparatus 10 also functions as a security system for a backup data writing area, and is for preventing a predetermined memory area for writing the backup data from being used illegally. Here, the system 100 may function as a security system for a backup data writing area.

It should be noted that the information processing apparatus 10 is implemented in a form of a portable game apparatus in this embodiment, but in another embodiment, this may be a computer in another form, such as a mobile information terminal, a cellular phone, a personal computer, a console game apparatus, or the like. Additionally, the server 102 is a computer, and has a CPU, a RAM, a ROM, an HDD, a communication device, and the like although illustration is omitted.

The information processing apparatus, that is, the game apparatus 10 can connect to the server 102 via an access point 104 and a network 106. The network 106 is a wide area network (WAN), the Internet or the like, or may be a local area network (LAN). When downloading data from the server 102, the game apparatus 10 connects to the access point 104 by wireless (or wired), and communicates with the server 102 on the network 106 via the access point 104. Here, the game apparatus 10 fetches IP addresses of the access point 104 and the server 102 according to an input or a list selection by the user, or the like.

Referring to FIG. 2, the game apparatus 10 includes a first liquid crystal display (LCD) 12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 2, the upper housing 16a has a plane shape little larger than a plane shape of the LCD 12, and has an opening formed so as to expose a display surface of the LCD 12 from one main surface thereof. On the other hand, the lower housing 16b has a plane shape and a size approximately the same as those of the upper housing 16a, and has an opening formed so as to expose a display surface of the LCD 14 at approximately the center of the horizontal direction. Also, a power switch 18 is provided at the right side surface of the lower housing 16b.

Furthermore, the upper housing 16a is provided with sound release holes 20a and 20b for speakers 36a and 36b (see FIG. 3) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case that a game is not played, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged, such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice or a breath which are taken from the microphone.

Furthermore, the lower housing 16b is provided with an operating switch 22 (22a, 22b, 22c, 22d, 22e, 22L and 22R). The operating switch 22 includes the direction instructing switch (cross switch) 22a, the start switch 22b, the select switch 22c, the action switch (A button) 22d, the action switch (B button) 22e, the action switch (X button) 22f, the action switch (Y button) 22g, the action switch (L button) 22L and the action switch (R button) 22R.

The switch 22a is arranged at the left of the LCD 14 on the one surface of the lower housing 16b. The other switches 22b-22g are arranged at the right of the LCD 14 on the one surface of the lower housing 16b. In addition, the operating switches 22L and 22R are arranged at the right and left corners on the upper side surface of the lower housing 16b. Here, the action switches 22L and 22R are provided on a back surface of the lower housing 16b, and shown by dotted line because they are hidden under the connected portion in a front view as shown in FIG. 2.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for making a transition to a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the operations similar to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button (L button) 22L and the right depression button (R button) 22R can be used for the operation the same as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position by the stick 26, etc. to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Furthermore, by utilizing the two LCD 12 and LCD 14 as one screen, it is possible to display a large monster (enemy object) to be defeated by the player object.

Accordingly, the player is able to point (operate) an image such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14 of the touch panel 24.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and two kinds of the operating portions (22, 24).

Although the first LCD 12 and the second LCD 14 are vertically arranged, the arrangement of the two LCDs may be changed as necessary. In another embodiment, the first LCD 12 and the second LCD 14 may horizontally be arranged.

Furthermore, in this embodiment, two LCDs are provided, but the number of LCDs as a display means can be changed as necessary. In another embodiment, a vertically-long LCD is provided, and by vertically dividing the display areas into two, two game screens may be displayed on the respective display areas, or a horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Moreover, the game apparatus 10 includes a memory card (or cartridge) 28. The memory card 28 is a storage medium detachable to the game apparatus 10, and inserted into a loading slot 30 (shown by dotted lines in FIG. 2) provided on an upper edge surface of the lower housing 16b. A connector 32 (see FIG. 3) for connecting to a connector 60 provided at an end portion of the memory card 28 in the loading direction is provided at a depth portion of the loading slot 30, and when the memory card 28 is loaded into the loading slot 30, the connectors are connected with each other, and therefore, the memory card 28 is accessible by a CPU 34 (see FIG. 3) of the game apparatus 10.

Furthermore, although omitted in FIG. 1, a battery accommodating box is provided on a rear surface of the lower housing 16b, a volume switch, an earphone jack, etc. are provided on the lower edge surface (bottom surface) of the lower housing 16b, and an external expansion connector is provided on the upper edge surface (top surface), for example.

Figure 3:
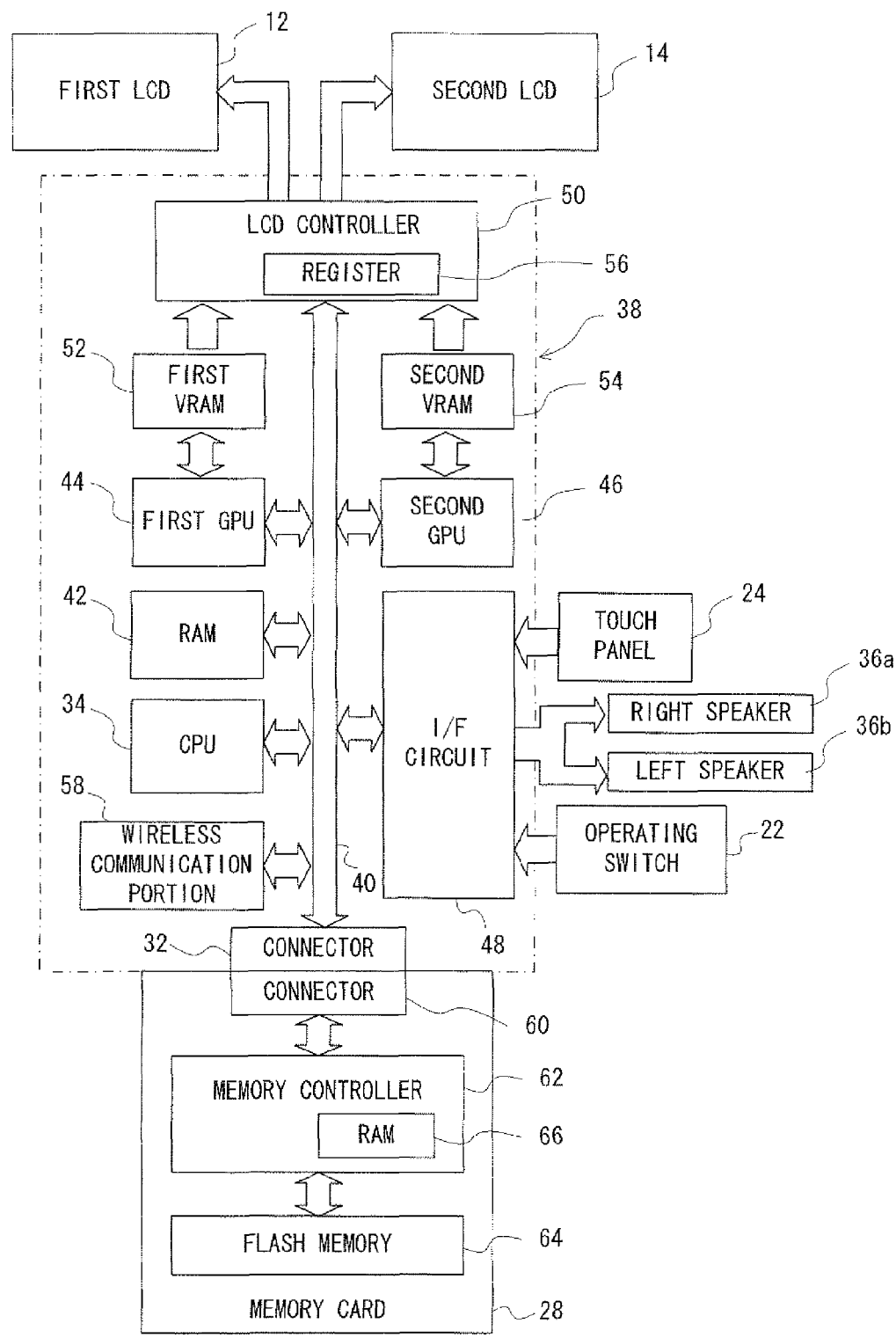
FIG. 3 is a block diagram showing one example of an electric configuration of the game apparatus shown in FIG. 2.

FIG. 3 is a block diagram showing an electrical configuration of the game apparatus 10. Referring to FIG. 3, the game apparatus 10 includes an electronic circuit board 38, and on the electronic circuit board 38, circuit components, such as a CPU 34, etc. are mounted. The CPU 34 is connected to the above-described connector 32 via a bus 40, and is connected with a RAM 42, a first graphics processing unit (GPU) 44, a second GPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a memory controller 62 and a flash memory 64, and the memory controller 62 is connected to the flash memory 64 and the connector 60 via a bus. Accordingly, as described above, the CPU 34 can access the flash memory 64 via the memory controller 62.

The memory controller 62 is a controlling apparatus for controlling writing and reading to and from the flash memory 64. The memory controller 66 has a RAM 66 as an internal memory.

The flash memory 64 stores in advance a game program for a game to be executed in the game apparatus 10, image data (images of characters and objects, background images, item images, icon (button) images, message images, etc.) and data of sound (music) (sound data), etc. necessary for the game. Furthermore, as described later, in the flash memory 64, an area for saving downloaded data and an area for storing backup data, such as proceeding data of the game and result data of the game are provided. Furthermore, in this embodiment, a NAND-type flash memory is applied as a flash memory 64. In another embodiment, another nonvolatile memory may be applied.

The RAM 42 of the game apparatus 10 is utilized as a buffer memory or a working memory. That is, the CPU 34 loads the game program, the image data, the sound data, etc. stored in the memory card 28 into the RAM 42, and executes the loaded game program. Furthermore, the CPU 34 executes a game processing while storing data (game data, flag data, etc.) temporarily generated or obtained in correspondence with a progress of the game in the RAM 42.

It should be noted that the game program, the image data, the sound data, etc. are read from the memory card 28 entirely at a time, or partially and sequentially so as to be stored into the RAM 42.

Here, in the game apparatus 10, an application other than the game may be executed, and in such a case, necessary data for the program and the image data, etc. as to the application may be stored in the flash memory 64 of the memory card 28. Furthermore, sound (music) data may be stored as required.

Each of the GPU 44 and the GPU 46 forms a part of a rendering means, is constructed by, for example, a single chip ASIC, and receives a graphics command (drawing instruction) from the CPU 34 to generate image data according to the graphics command. It should be noted that the CPU 34 applies an image generation program (included in the game program) required to generate the image data to both of the GPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) to execute a graphics command.

In addition, the CPU 34 writes image data necessary for drawing to the first VRAM 52 and the second VRAM 54 via the GPU 44 and the GPU 46. The GPU 44 accesses the VRAM 52 to produce image data necessary for drawing and stores the same in a rendering buffer of the VRAM 52. The GPU 46 accesses the VRAM 54 to produce image data for drawing and stores the same in the rendering buffer of the VRAM 54. As a rendering buffer, a frame buffer, a line buffer, etc. may be adopted.

The VRAM 52 and the VRAM 54 are connected to the LCD controller 50. The LCD controller 50 includes a register 56, and the register 56 consists of one bit, for example, and stores a value of "0" or "1" (data value) according to an instruction of the CPU 34. The LCD controller 50 outputs the image data produced by the GPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the GPU 46 to the LCD 12 in a case that the data value of the register 56 is "1".

Furthermore, the LCD controller 50 can directly read the image data from the VRAM 52 and the VRAM 54, or read the image data from the VRAM 52 and the VRAM 54 via the GPU 44 and the GPU 46.

In addition, the VRAM 52 and the VRAM 54 may be provided in the RAM 42, or a rendering buffer and a Z buffer therefor may be provided in the RAM 42.

The I/F circuit 48 is connected with the operating switch 22, the touch panel 24 and the speakers 36a, 36b. Here, the operating switch 22 is the above-described switches 22a, 22b,

22*c*, 22*d*, 22*e*, 22*f*, 22*g*, 22L and 22R, and in response to an operation of the operating switch 22, a corresponding operation signal (operation data) is input to the CPU 34 via the I/F circuit 48. Furthermore, coordinates data output from the touch panel 24 is input to the CPU 34 via the I/F circuit 48. In addition, the CPU 34 reads from the RAM 42 the sound data necessary for the game, such as a game music (BGM), a sound effect or voices of a game character (onomatopoeic sound), etc., and outputs it from the speakers 36*a*, 36*b* via the I/F circuit 48.

The wireless communication portion 58 is a communication means for transmitting and receiving data with another game apparatus 10 or communication equipment by radio waves. Here, the weak radio wave transmitted and received by the game apparatus 10 is set in intensity to such a degree as not to be restricted by the Radio Law. When the CPU 34 applies data such as game data, a command, etc. to the wireless communication portion 58, the wireless communication portion 58 modulates communication data to be transmitted to the opponent into a wireless signal and transmits it from an antenna. Furthermore, the wireless communication portion 58 receives a wireless signal from the opponent by the antenna to demodulate it to data, and applies the data to the CPU 34. By utilizing the wireless communication portion 58, the game apparatus 10 can receive and transmit data with other game apparatuses 10 to thereby execute a communication game. The game apparatus 10 can connect to the access point 104 and the network 106 via the wireless communication portion 58, and thus can download a program and data from a server 102 on the network 106, and communicate with another game apparatus 10 via the network 106.

Figure 4:
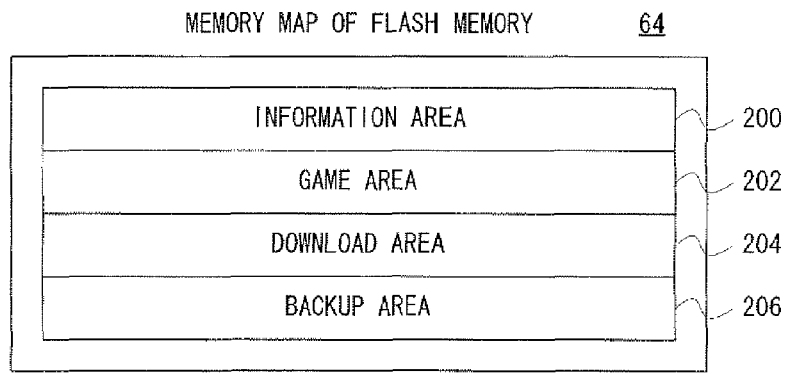
FIG. 4 is an illustrative view showing one example of a memory map of a flash memory shown in FIG. 3.

In the system 10, a predetermined area for writing the data downloaded from the server 102 is provided to the flash memory 64 of the memory card 28. Furthermore, a predetermined area for writing backup data to be generated during execution of a game (application) is provided to the flash memory 64. One example of the memory map of the flash memory 64 is shown in FIG. 4. The flash memory 64 is provided with an information area 200, a game area 202, a download area 204, a backup area 206, etc. Here, FIG. 4 shows a part of the memory map, and can be provided with other areas.

Figure 8:
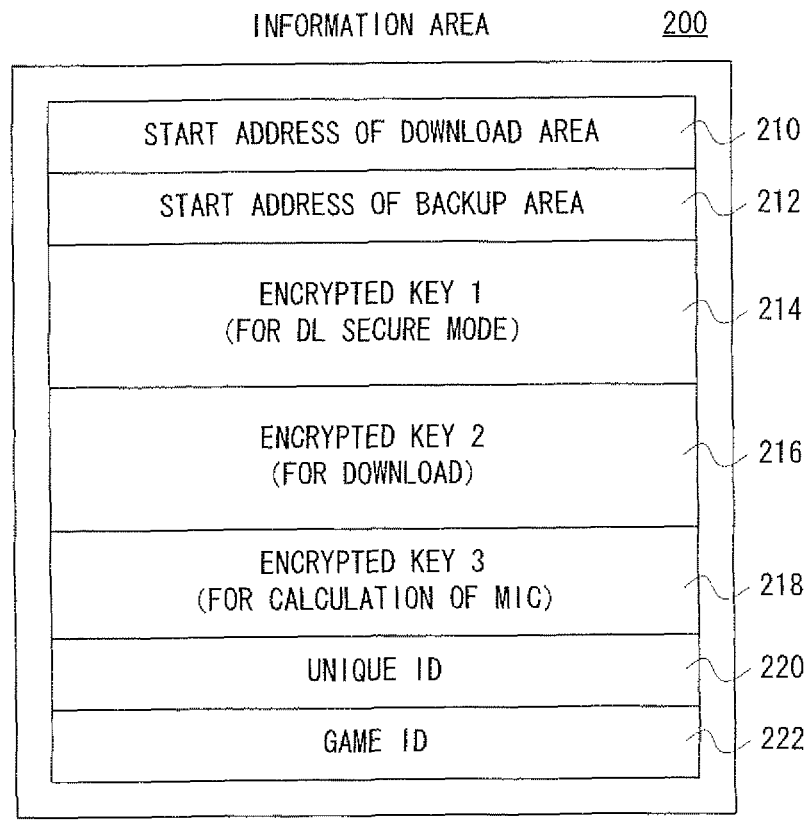
FIG. 8 is an illustrative view showing one example of a memory map of an information area shown in FIG. 4.

The download area 204 is an area for writing data downloaded from the server 102, and the backup area 206 is an area for writing backup data. Here, in the information area 200, as shown in FIG. 8 described later, header information of the flash memory 64 and predetermined data are stored in advance. Furthermore, in the game area 202, a game program and data are stored in advance. The game program includes a game processing program, a download processing program, a backup processing program, etc.

Figure 5:
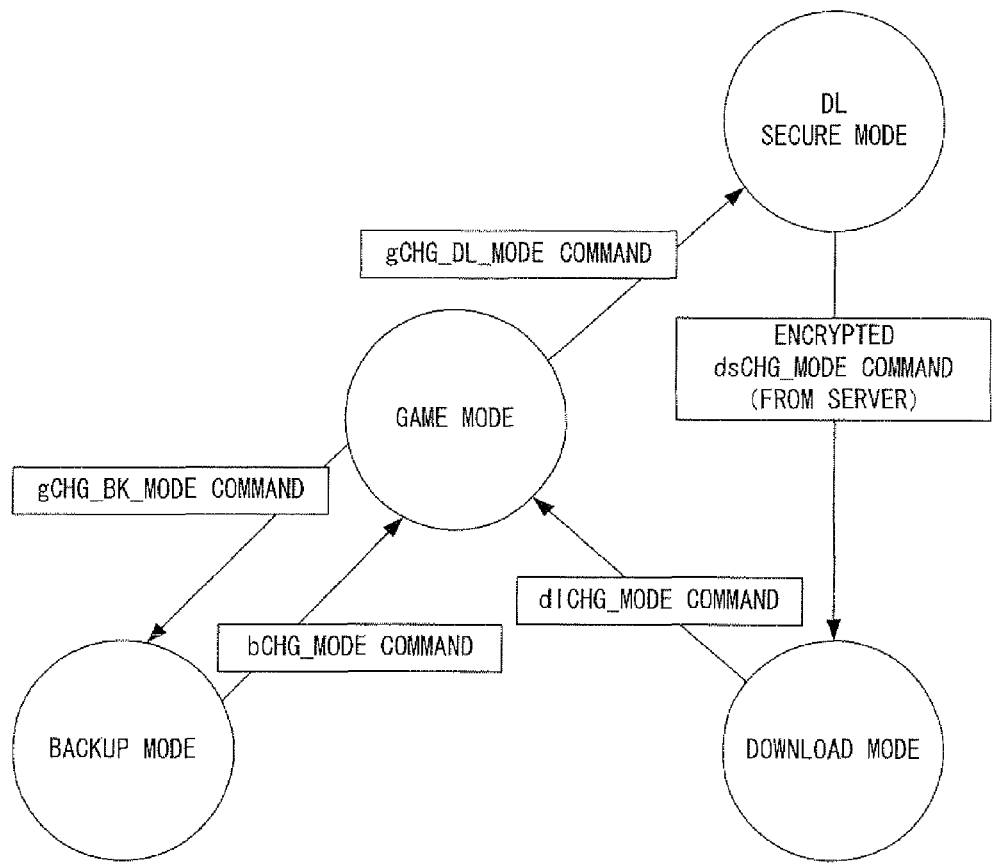
FIG. 5 is an illustrative view showing an outline of a mode transition of a memory controller shown in FIG. 3.

An operation of the memory controller 62 is controlled depending on a mode such that the writing area provided to the flash memory 64 is protected stepwise. For each mode, an executable operation by the memory controller 62 is restricted, and there is a need of switching the mode to execute a necessary operation. An outline of a mode transition of the memory controller 62 is shown in FIG. 5. The memory controller 62 has a game mode, a DL (Download) secure mode, a download mode, a backup mode, etc. The memory controller 62 is configured to make a mode transition in response to various transition commands applied externally (the CPU 34 being a host, or the server 102 on the network 106). Additionally, the CPU 34 issues the transition command by executing the application program (a program stored in the game apparatus 10 may be appropriate) stored in the memory card 28.

The game mode is a normal mode. When the power of the game apparatus 10 is turned on, for example, an electric power is supplied from the game apparatus 10 to the memory controller 62 so as to activate it. When being activated, the memory controller 62 is placed in the game mode, and is basically in the game mode during execution of the game (more specifically, when no data is required to be written to the flash memory) as well. During execution of the game, a program and data have to be read from the flash memory 64 as necessary, and in this game mode, it is desirable that reading from the flash memory 64 is performed at high speeds. Thus, in the game mode, the command to be applied to the memory controller 62 may not be encrypted, but even if the command is encrypted, the command may be protected to such a degree to be encrypted by an algorism of low processing load. Additionally, in the game mode, even if the host (CPU 34) issues a data writing command to the flash memory 64, the memory controller 62 does not accept the command, and thus it is impossible to write the data into the flash memory 64.

The flash memory 64 is provided with a download area 204 for writing downloaded data in order to download data from the server 102 according to a selection by the player or according to a program during execution of the game. In a case of downloading, the degree of security has to be heightened for protecting the flash memory 64 from an unauthorized computer access. Thereupon, the memory controller 62 makes a transition from the game mode in which an access to the flash memory 64 is easy to a mode of a high degree of security.

Furthermore, a transition is not directly made from the game mode to the download mode in which download data can be written, but another mode, that is, a DL secure mode in this embodiment is interposed so as to perform protection at two levels when downloading.

More specifically, when a gCHG_DL_MODE command is applied to the memory controller 62 in the game mode, the memory controller 62 makes a transition from the game mode to the DL secure mode. Here, the gCHG_DL_MODE command is a transition command for making a transition from the game mode to the DL secure mode, and is issued by the CPU 34 of the game apparatus 10.

The DL secure mode is a mode provided for heightening the degree of security at a time of downloading. In the DL secure mode, a command to be applied to the memory controller 62 is encrypted. More specifically, an encrypted dsCHG_MODE command is applied to the memory controller 62. Here, the dsCHG_MODE command is a transition command for making a transition from the DL secure mode to the download mode. The transition command to the download mode is not issued from the CPU 34 of the game apparatus 10, but transmitted from the server 102 after it being encrypted in the server 102. It should be noted that the CPU 34 of the game apparatus 10 cannot generate the dsCHG_MODE command. This is because the dsCHG_MODE command is to be applied to the memory controller 62 in the encrypted state, and the CPU 34 of the game apparatus 10 does not have key data for the encryption. The memory controller 62 decrypts the command received in the DL secure mode, and makes a transition to the download mode when the command is the dsCHG_MODE command. For encryption of the transition command, the server 102 and the memory card 28 store a common key.

Thus, it is possible to perform protection with respect to a transition from the DL secure mode to the download mode. Furthermore, a transition command to the DL secure mode is issued from the CPU 34 being the host while a transition command to the download mode is issued from the server

102. That is, the transition to the download mode is enabled by cooperation between the CPU 34 and the server 102, so that it is possible to further heighten the degree of security.

In the download mode, data downloaded from the server is written to the download area 204. The data to be downloaded is encrypted in the server and transmitted while the received data is decrypted by the memory controller 62. Thus, it is possible to protect the data to be downloaded. Furthermore, the encryption key in the DL secure mode and the encryption key in the download mode are differentiated from each other, resulting in the two levels of security. Thus, it is possible to separately protect the transition command and the data.

The download data is encrypted in the server as described above, and when receiving the encrypted data, the CPU 34 transfers it to the memory controller 62. For writing the data, the CPU 34 issues a writing command (dWR_PAGE command). In response to the writing command, the memory controller 62 executes processing for writing the data, such as decryption of data, etc. If it is authenticated that the received data is authorized data, the memory controller 62 writes this data to the download area 204. The writing to the download area 204 is made possible only in the download mode. The memory controller 62 is configured to accept the writing command issued by the CPU 34 only in the download mode, and thus, in another mode, writing to the download area 204 is made impossible.

After completion of writing the predetermined data, in response to a dlCHG_MODE command, the memory controller 62 makes a transition to the game mode. Here, the dlCHG_MODE command is a transition command for making a transition from the download mode to the game mode, and issued from the CPU 34.

Figure 6:
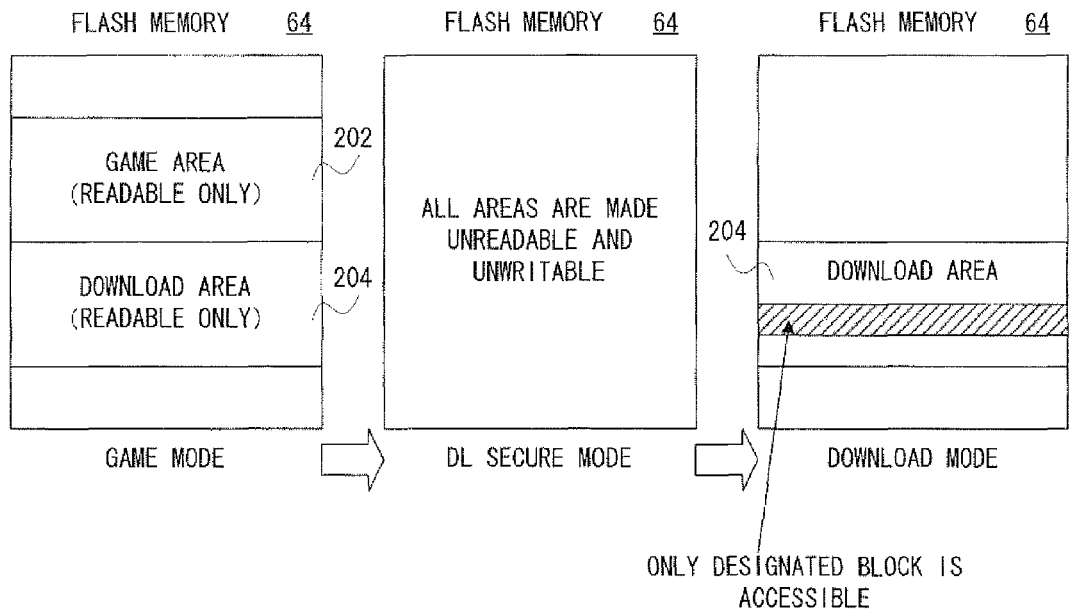
FIG. 6 is an illustrative view showing a change of the memory map of the flash memory in a case of a transition to a download mode.

In the mode transition as to the downloading, accessibility to the flash memory 64 is changed. FIG. 6 shows the changes of the memory map of the flash memory 64 when a transition to the download mode is made. First, in the game mode, the game area 202 and the download area 204 are set to be readable only. Then, when a transition is made to the DL secure mode in response to the gCHG_DL_MODE command, all the areas are set to unreadable and unwritable states. The processing of the encrypted dsCHG_MODE command is performed in a state that all the areas of the flash memory 64 are made inaccessible. Then, when a transition is made to the download mode in response to the dsCHG_MODE command, the download area 202 is made accessible. Moreover, in this embodiment, only the block designated by the dsCHG_MODE command out of the download area 202 is made accessible. Thus, depending on the transition of the mode, readable and writable states are changed with respect to each area of the flash memory 64, that is, the memory map is changed for each mode, capable of heightening the degree of security.

On the other hand, during execution of the game, the CPU 34 generates backup data of the game. The backup area 206 for writing the backup data is provided to the flash memory 64. The writing to the backup area 206 itself is to be locally performed in nature, but program data illegally acquired from the network 106, for example, may be written to the backup area 206. In order to prevent the backup area 206 from being illegally used, the degree of security of the backup area 206 is heightened.

As shown in FIG. 5, in order to perform writing to or reading from the backup area 206, the memory controller 62 makes a transition from the game mode to the backup mode in response to a gCHG_BK_MODE command. Here, the gCHG_BK_MODE command is a transition command for making a transition from the game mode to the backup mode, and is issued to the memory controller 62 by the CPU 34 being the host. Additionally, in response to a bCHG_MODE command, the memory controller 62 makes a transition to the game mode. Here, the bCHG_MODE command is a transition command for making a transition from the backup mode to the game mode, and is issued to the memory controller 62 by the CPU 34 being the host.

In the backup mode, when data is to be written, data to be written is transformed into a predetermined format by the CPU 34, and the data in the predetermined format is written to the backup area 206 by the memory controller 62. On the other hand, when data is to be read, it is determined whether or not the read data is in the predetermined format by the memory controller 62. If it is determined that the data is in the predetermined format, the data is output to the CPU 34.

However, if it is determined that the data is not in the predetermined format, the data is regarded as data being illegally written to the backup area, and the memory controller 62 makes a transition to an illegal mode. When the transition to the illegal mode is made, the data is not output, thus capable of preventing the backup area from being illegally used.

Additionally, in this embodiment, when it is determined that the written data is not in the predetermined format, the memory controller 62 outputs no data, but in another embodiment, the memory controller 62 outputs predetermined data indicating that this is unauthorized data to the CPU 34 to thereby allow the CPU 34 to perceive the illegally written data. In this case as well, the written data is not normally output, so that it is possible to protect the backup area 206 from the unauthorized use.

Figure 7:
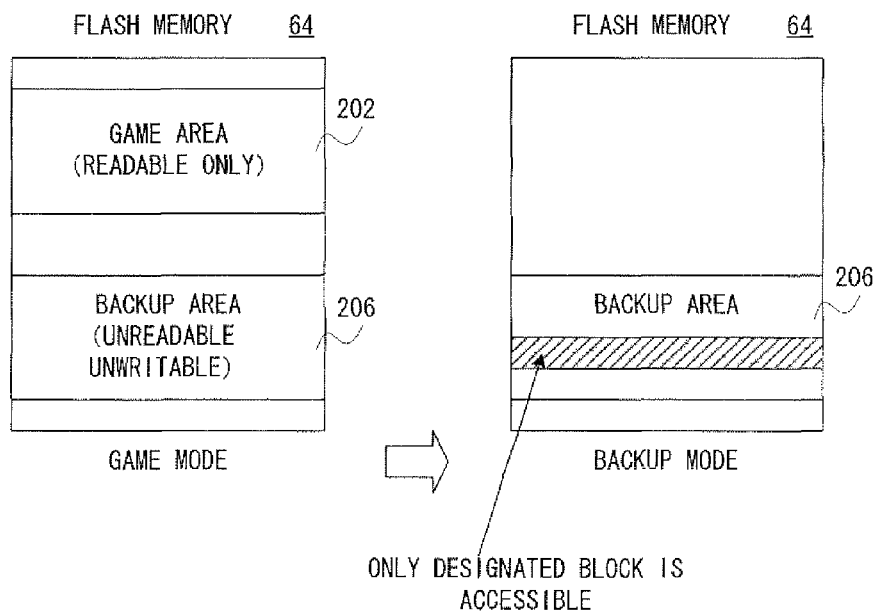
FIG. 7 is an illustrative view showing a change of the memory map of the flash memory in a case of a transition to a backup mode.

In the mode transition as to the backup as well, accessibility to the flash memory 64 is changed. FIG. 7 shows the changes of the memory map of the flash memory 64 when a transition is made to the backup mode. In the game mode, the game area 202 is set to a state of being readable only, and the backup area 206 is set to unreadable and unwritable states. Then, when a transition to the backup mode is made in response to the gCHG_BK_MODE command, only the backup area 206 is set to the accessible state. Moreover, in this embodiment, only the block designated by the gCHG_BK_MODE command out of the backup area 206 is made accessible. Thus, as in the downloading case, in response to the transition of the mode, readable and writable states are changed with respect to each area of the flash memory 64, that is, the memory map is changed for each mode, capable of heighten the degree of security.

It should be noted that in this embodiment, writing to the backup area 206 is made possible only after the transition to the backup mode. This is because of preventing the data written once at the factory, for example, from being erroneously overwritten. However, as a modified example, the backup area 206 out of the flash memory 64 may be writable even in the game mode.

FIG. 8 shows one example of a memory map of the information area 200 of the flash memory 64. Additionally, FIG. 8 is a part of the information area 200 and also stores other necessary data, such as a start address of the game area 202, etc.

In a memory area 210, a start address of the download area 204 is stored in advance, and in a memory area 212, a start address of the backup area 206 is stored in advance. A size or an end address of the download area 204 and the backup area 206 may be stored for the rest. As header information, data capable of discriminating each of the download area 204 and the backup area 206 and other areas, that is, boundary data of each area may be stored. The memory controller 62 can grasp and access each area by referring to the boundary data of each area.

In a memory area 214, an encrypted key 1 is stored in advance. The key 1 is a key for DL secure mode (encryption key), that is, a key to be used in the DL secure mode. By the key 1, the dsCHG_MODE command encrypted in the server 102 is decrypted.

Additionally, the flash memory 64 stores encrypted keys, so that it is possible to make the content of the key unreadable even if the flash memory 64 is taken out from the memory card 28, and the data is illegally read.

In a memory area 216, an encrypted key 2 is stored in advance. The key 2 is a key for the download mode (encryption key), that is, a key to be utilized in the download mode. By the key 2, the data to be downloaded which is encrypted in the server 102 is decrypted.

In a memory area 218, an encrypted key 3 is stored in advance. The key 3 is a key for message digest authentication (encryption key) of the data to be downloaded, that is, a key for calculating a message integrity code (MIC) as an authentication symbol of the data to be downloaded. It should be noted that in this embodiment, a configuration in which a part of the key 3 is the same as a part of the key 2 is adopted. That is, the key 3 is a key obtained by replacing a part of the key 2 (part except for the common part). Then, in the memory area 218, only the above-described rest part of the key 3 (part except for the part common to the key 2) is encrypted and stored. When the complete key 3 is required for the MIC calculation, the key 3 of the memory area 218 and the common part of the key 2 are utilized.

In a memory area 220, a unique ID indicating identification information of the memory card 28 (flash memory 64) is stored. Furthermore, in a memory area 222, a game ID indicating identification information of the game or the application of the memory card 28 is stored. The game ID may be a title and a kind of the game.

Additionally, in this embodiment, in the flash memory 64, a key being specific to the memory card 28 is stored. That is, keys 1, 2 and 3 corresponding to the unique ID are stored. In another embodiment, a key being specific to the game title, that is, keys 1, 2 and 3 corresponding to the game ID may be stored.

Figure 9:
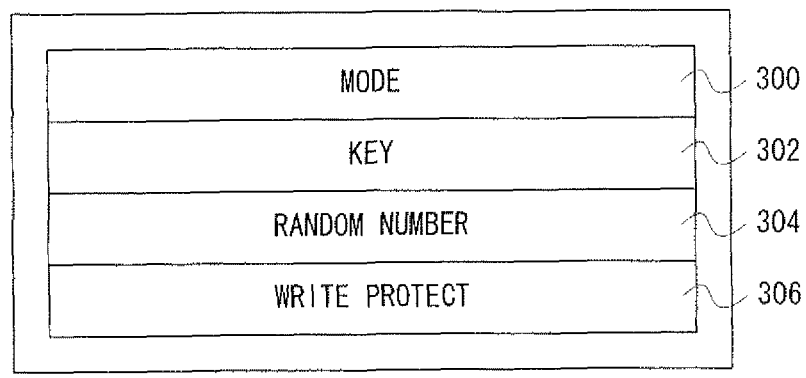
FIG. 9 is an illustrative view showing one example of a memory map of an internal RAM of the memory controller.

FIG. 9 shows one example of a memory map of the internal RAM 66 of the memory controller 62. Here, FIG. 9 shows a part of the memory map of the internal RAM 66.

In a memory area 300, a current mode is stored. By this mode data, the memory controller 62 can grasp the current mode. When receiving a command, the memory controller 62 may determine, before execution of the command, whether or not the command is a command defined as being issued in the current mode. Thus, it is possible to determine a normally issued command.

A memory area 302 is a key memory area. Keys corresponding to the current mode are stored. As described above, in this embodiment, each key is encrypted and stored in the information area 200 of the flash memory 64. The memory controller 62 reads the key in the work area of the internal RAM 66 to decrypt the same, and stores the decrypted key in the memory area 302. Furthermore, when a transition is made in response to each transition command, each key may be developed in the memory area 302.

Figure 10:
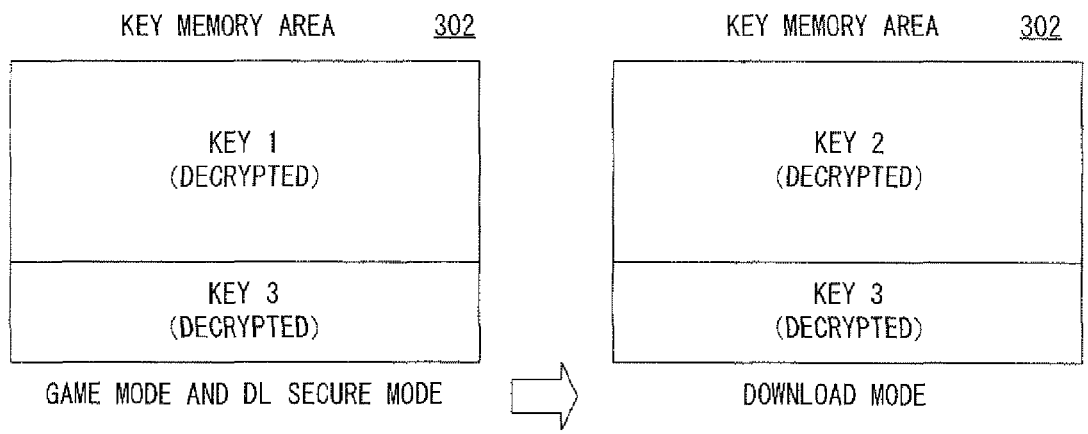
FIG. 10 is an illustrative view showing a change of a memory map of a key memory area shown in FIG. 9.

More specifically, as shown in FIG. 10, in the DL secure mode, in the key memory area 302, a decrypted key 1 and a decrypted key 3 (strictly, a part of the key 3 in this embodiment) are stored. Here, the key 1 is a key for the DL secure mode, but in this embodiment, in the game mode as well, predetermined data (the random number and the unique ID or the game ID) may be encrypted by utilizing the key 1, so that the key 1 has already been stored in the memory area 302 from the game mode. Furthermore, the key 3 is made resident until the power is turned off. The part of the key 3 is smaller than the part shared with the key 2, so that this is developed in advance. Additionally, when a transition from the game mode to the DL secure mode is made, the key 1 is read again from the flash memory 64 so as to be decrypted and then developed in the memory area 302. This is a re-development by way of caution in view of the fact that the data on the internal RAM 66 may be rewritten due to any accident.

When a transition to the download mode is made, the key 1 is replaced with the key 2. That is, the key 1 is erased from the memory area 302, and the key 2 is read in the work area from the flash memory 64 so as to be decrypted, and the decrypted key is stored in the memory area 302. Furthermore, the key 3 is stored as it is. As described above, the key 2 is used for encrypting the data to be downloaded in the download mode while the key 3 is used for calculating the MIC of the data to be downloaded. As in this embodiment, one part is shared between the key 2 and the key 3, so that the size of the area to be ensured for the key memory area 302 is reduced, resulting in reduction in the capacity of the internal RAM 66 and the cost.

Alternatively, in another embodiment, the complete key 3 may be stored in advance, and the key 3 is developed in the key memory area 302.

Returning to FIG. 9, a memory area 304 stores a random number. The random number is a pseudo random number, and generated when predetermined processing is executed in the memory controller 62. Furthermore, in the memory area 306, a flag indicating a write protection is stored. When the write protection is turned on, writing by the flash memory 64 to the download area 204 is inhibited.

Figure 11:
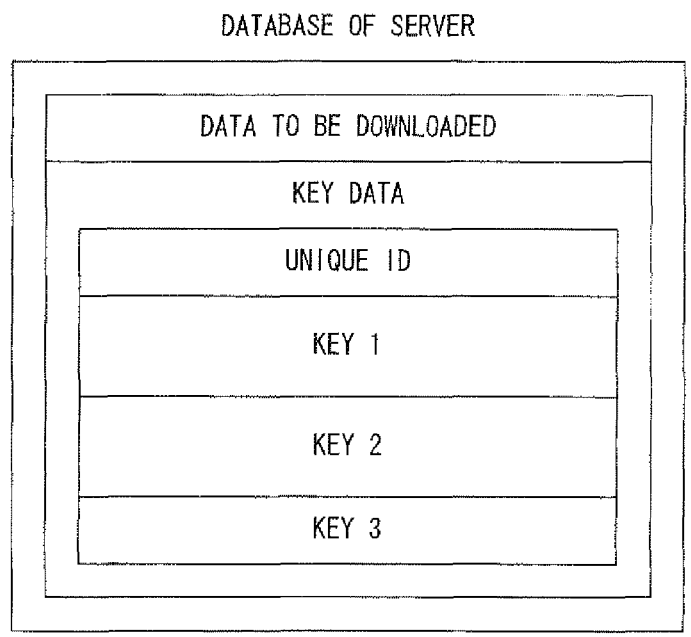
FIG. 11 is an illustrative view showing one example of a database of a server shown in FIG. 1.

FIG. 11 shows one example of data to be stored in the database of the server 102. Here, the database is stored in an HDD, a ROM, or the like of the server 102.

In the database, the data to be downloaded is stored. The data to be downloaded is data to be stored in the download area 204 of the memory card 28. For example, a file for downloading may be prepared for each game title, that is, in correspondence with the game ID.

Furthermore, key data is stored in the database. In this embodiment, as described above, a specific key is prepared for each memory card 28, so that a key 1, a key 2 and a key 3 are stored by being brought into correspondence with the unique ID. It should be noted that similar to the memory card 28, with respect to the key 3, a part may be shared with the key 2, and therefore, the rest part is stored, or the complete key 3 may be stored.

Additionally, in another embodiment, keys for each game title may be prepared, that is, the keys 1, 2 and 3 may be stored by being brought into correspondence with the game ID.

Figure 12:
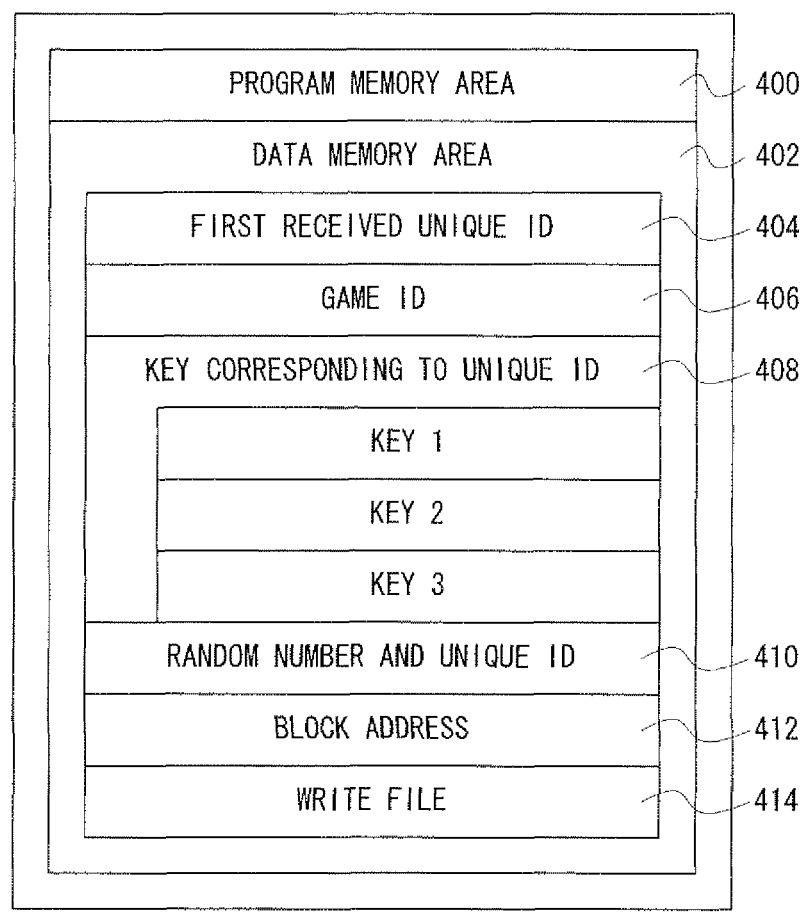
FIG. 12 is an illustrative view showing one example of a memory map of a RAM of a server.

FIG. 12 shows one example of a memory map of the RAM of the server 102. Here, the memory map shows a part, and other necessary program and data are also stored.

A memory area 400 is a program memory area, and stores a program for executing the download processing of the server 102. The program is read from the ROM, the HDD, or the like.

A memory area 402 is a data memory area, and stores data read from the ROM, the HDD, or the like, data generated by the CPU, data received from the game apparatus 10, etc.

In a memory area 404, a unique ID received first is stored, and in a memory area 406, a game ID is stored. More specifically, when download processing is started, the unique ID and the game ID are first transmitted from the game apparatus 10, and the unique ID and the game ID are respectively stored in the memory areas 404 and 406.

In a memory area 408, the keys read from the database are stored. In this embodiment, the keys 1, 2 and 3 corresponding to the unique ID are stored.

In a memory area 410, a random number and a unique ID are stored. More specifically, data of the random number and the unique ID which are encrypted with the key 1 are transmitted from the game apparatus 10 after the first unique ID, and the random number and the unique ID obtained by decrypting the reception data with the key 1 are stored in the memory area 410.

In a memory area 412, a block address is stored. More specifically, following the above-described random number and unique ID, a block address where writing is made is transmitted from the game apparatus 10, and the block address is stored in the memory area 412. In this embodiment, the server 102 transmits a transition command which designates the block address to the memory controller 62 via the game apparatus 10 to designate the block address where a file to be downloaded is written.

In a memory area 414, a write file is stored. More specifically, the file for the data to be downloaded read from the database is stored. If the download data is prepared for each game title, the data corresponding to the game ID is stored. Alternatively, the data corresponding to the unique ID, that is, the data for each memory card 28 may be read, and predetermined data may be read irrespective of the game ID and the unique ID. From the write file, a predetermined amount of data is sequentially fetched and transmitted to the game apparatus 10.

Figure 13:
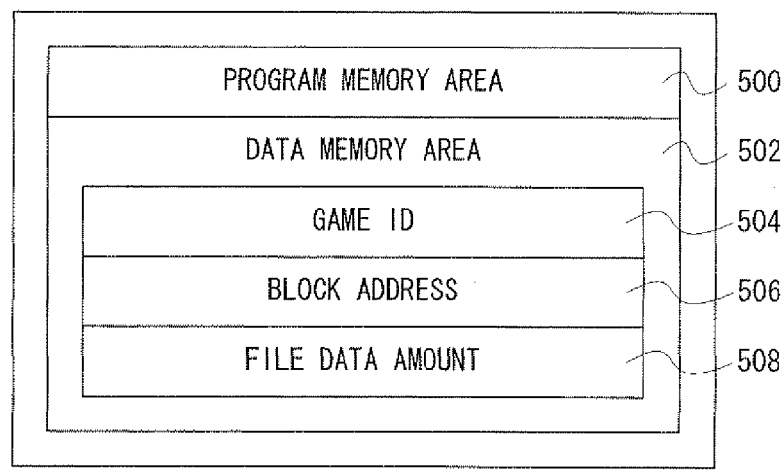
FIG. 13 is an illustrative view showing one example of a memory map of a RAM of the game apparatus at a time of download processing.

FIG. 13 shows one example of a memory map of the RAM 42 of the game apparatus 10 in the download processing. Additionally, FIG. 13 shows a part of the memory map, and other necessary data is stored.

A memory area 500 is a program memory area, in which a program for executing the processing by the game apparatus 10 is read from the memory card 28 and stored. The program includes game processing program, download processing program, etc.

A memory area 502 is a data memory area, in which data fetched from the memory card 28, data generated by the CPU 34, data received from the server 102, etc. are stored.

In a memory area 504, a game ID is stored. The game ID is read from the memory area 222 of the information area 200 of the flash memory 64 by the memory controller 62 so as to be output, and applied to the CPU 34 via the connector 60, the connector 32, etc when the power is turned on. The game ID, when the unique ID is transmitted to the server 102 at first, is transmitted together therewith.

In a memory area 506, a block address where the downloaded data is to be written is stored. In the game apparatus 10, a space area of the download area 204 is ensured, and a block address to be written is decided from the space area. The block address is transmitted to the server 102.

In a memory area 508, a file data amount to be downloaded from the server 102 is stored. The file data amount of the file to be downloaded is transmitted from the server 102, so that the received file data amount is stored in the memory area 508. By the file data amount, the CPU 34 can determine whether or not all data of the write file have been written.

Figure 14:
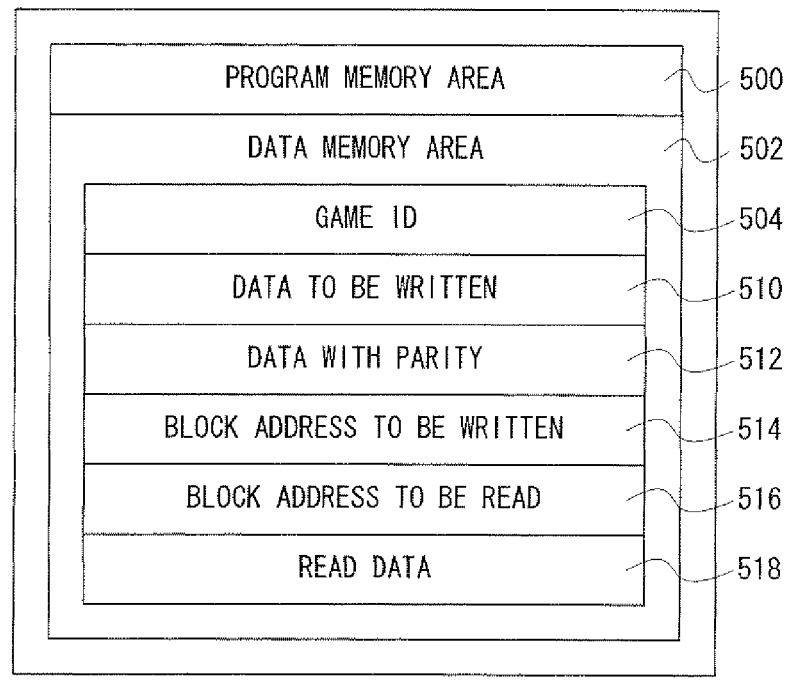
FIG. 14 is an illustrative view showing one example of the memory map of the RAM of the game apparatus at a time of backup processing.

FIG. 14 shows one example of a memory map of the RAM 42 of the game apparatus 10 at a time of the backup processing. Here, FIG. 14 also shows a part of the memory map similar to FIG. 13.

The memory area 500 is a program memory area, and stores the game processing program, the backup processing program, etc. which are read from the memory card 28.

In the memory area 504 of the data memory area 502, similar to the download processing in FIG. 13, the game ID read from the memory card 28 is stored.

In a memory area 510, data to be written is stored. That is, the backup data generated during execution of the game (application) by the CPU 34 is stored.

In a memory area 512, data with parity is stored. The data to be written is transformed in a predetermined format by the CPU 34 and then written to the backup area 206. In this embodiment, a parity bit is added to the backup data. The data with parity is written to the backup area 206.

Figure 15:
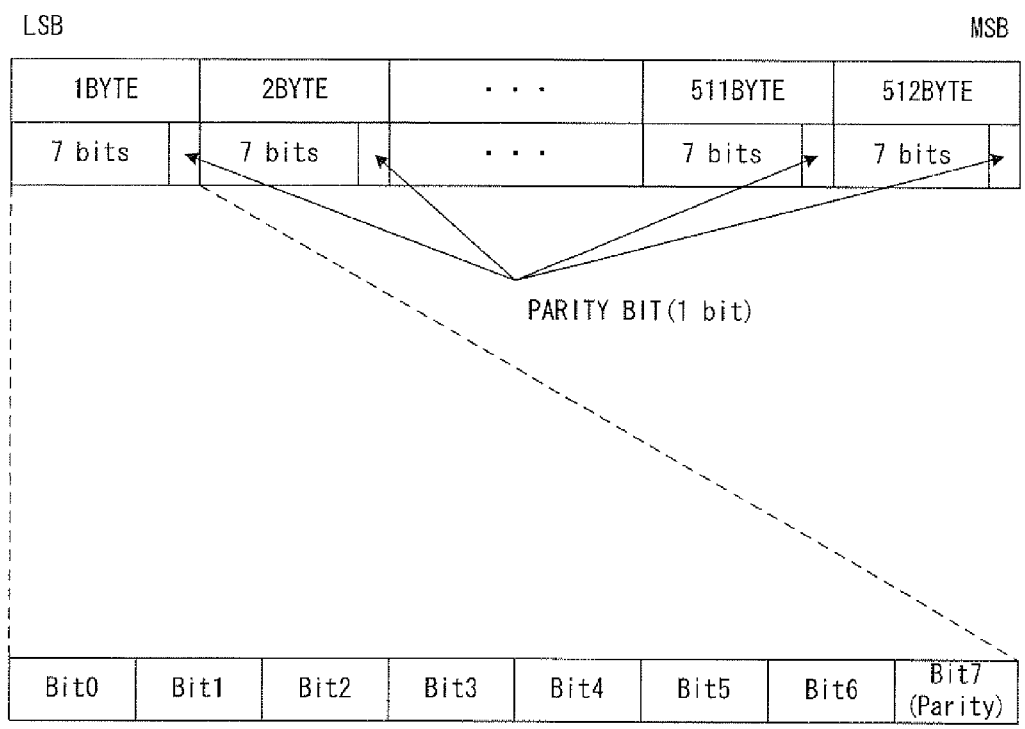
FIG. 15 is an illustrative view showing one example of data with parity to be written to the backup area.

FIG. 15 shows one example of the data with parity. FIG. 15 is structural example of page data (512 bytes) of the backup area 206, and in this embodiment, the data structure of each byte is "7-bit data"+"parity (1 bit) of the 7-bit data". That is, with respect to the data to be written, the parity bit of one bit is added to every 7 bits to thereby generate the data with parity. For example, in a bit string of bits 0-6, if there is an even number of "1", "1" is written to the bit 7 while if there is an odd number of "1" in the bite string, "0" is written to the bit 7.

In a memory area 514, a block address to be written is stored. The CPU 34 of the game apparatus 10 ensures a space area of the backup area 206, decides a block address where the data with parity is to be written, and stores the block address in the memory area 514. The block address to be written is designated in the transition command for making a transition to the backup mode.

In a memory area 516, a block address to be read is stored. The CPU 34 confirms a storing position of the data to be read of the backup area 206, decides the block address to be read, and stores the block address in the memory area 516. The block address to be read is designated in the transition command for making a transition to the backup mode.

In a memory area 518, the data read from the backup area 206 of the memory card 28 is stored. Whether the data to be read from the backup area 206 is data with parity or not is checked by the memory controller 62 when being read. If the data is read from the backup area 206, the data is data authorizedly written to the backup area 206, so that the CPU 34 can remove the parity from the read data to transform it to the original data, and can use the data. On the other hand, if it is determined that the data of the backup area 206 is data unauthorizedly written data as a result of the parity check, the memory controller 62 makes a transition to the illegal mode so as to output no data. Thus, the reading processing of the backup data has not been finished, so that a normal operation cannot be performed.

The entire operation of the system 10 during the download processing is briefly explained with reference to FIG. 16 to FIG. 19. It should be noted that an operation of each of the game apparatus 10, the memory controller 62 and the server 102 at a time of the download processing is explained by utilizing an individual flowchart.

Figure 16:
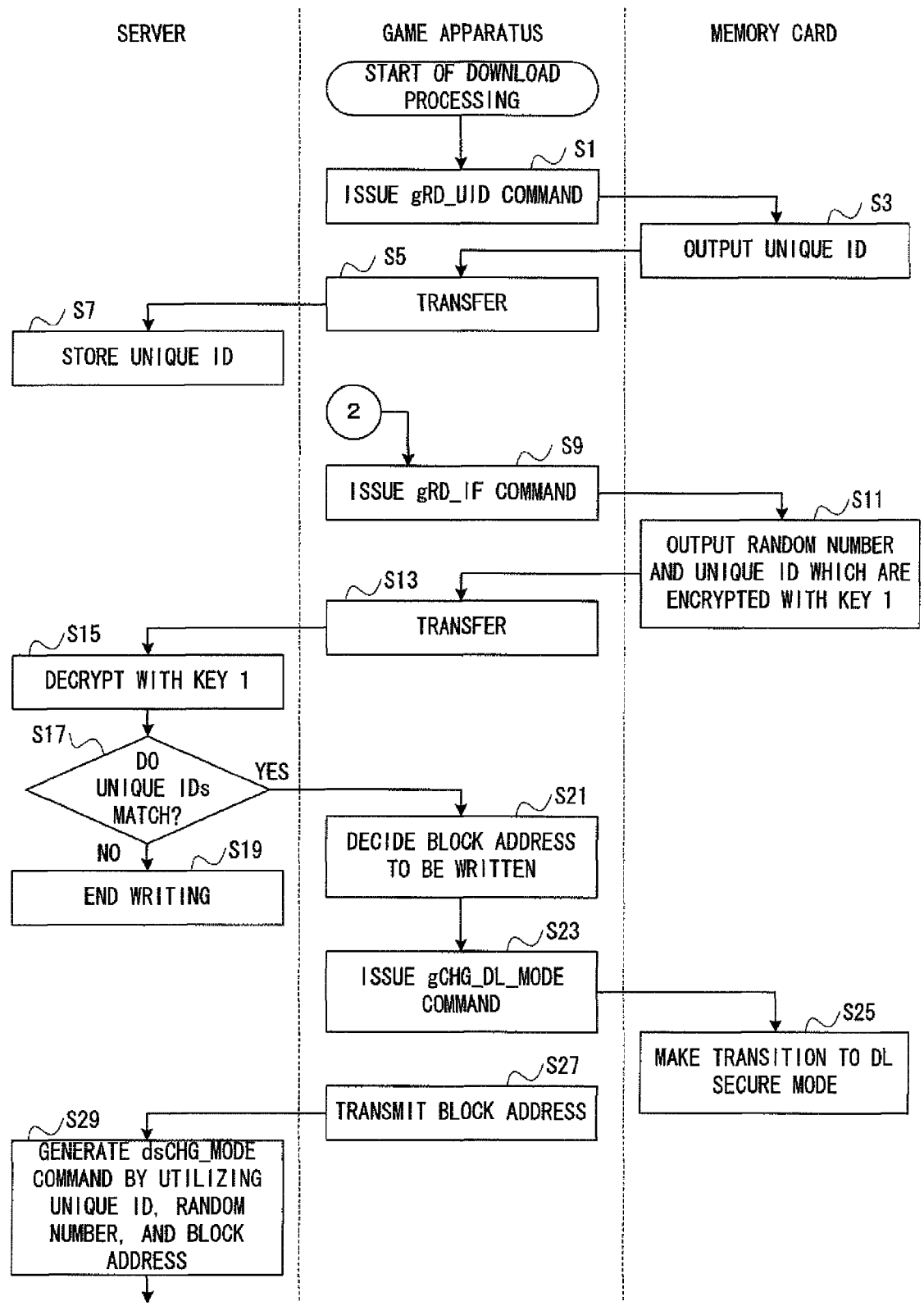
FIG. 16 is a flowchart showing a part of one example of an operation of the system at a time of the download processing.

The download processing is started when the memory controller 62 of the memory card 28 is in the game mode. Referring to FIG. 16, when the download processing is started, the CPU 34 of the game apparatus 10 issues a gRD_UID command to the memory card 28 in a step S1. The gRD_UID command is a command for reading a unique ID from the memory card 28. In response thereto, the memory controller 62 reads a unique ID from the flash memory 64 and outputs the same to the game apparatus 10 in a step S3. The CPU 34 transfers the received unique ID to the server 102 in a step S5, and the CPU of the server 102 stores the received unique ID in the RAM. Thus, the unique ID of the memory card 28 is transmitted to the server 102. The unique ID is compared with a unique ID which is received later for authenticating the memory card 28.

Succeedingly, the CPU 34 of the game apparatus 10 issues a gRD_IF command to the memory card 28 in a step S9. The gRD_IF command is a command for reading the random number and the unique ID in the memory card 28. In response thereto, the memory controller 62 outputs the generated random number and the unique ID read from the flash memory 64 to the game apparatus 10 in a step S11. Here, the random number and the unique ID are encrypted by the key 1 developed in the internal RAM 66. The CPU 34 transfers the received data to the server 102 in a step S13. The CPU of the server 102 decrypts the received data with a key 1 in a step S15. The key 1 to be used is the key 1 corresponding to the unique ID. Then, the CPU of the server 102 determines whether or not the unique ID decrypted in the step S15 and the unique ID received first in the step S7 match with each other in a step S17. If "NO" in the step S17, that is, if the unique ID is different from the unique ID first received, since the memory card 28 cannot be acknowledged as an authorized card, the CPU of the server 102 ends the download writing processing in a step S19.

On the other hand, if "YES" in the step S17, that is, if it is determined that the memory card 28 is the authorized card by the server 102, the CPU 34 of the game apparatus 10 designates a block address for writing data to be downloaded in the download area 204 in a step S21. Furthermore, the CPU 34 issues a gCHG_DL_MODE command to the memory card 28 in a step S23. The gCHG_DL_MODE command is a transition command for making a transition from the game mode to the DL secure mode. In response thereto, the memory controller 62 makes a transition to the DL secure mode in a step S25.

Furthermore, in a step S27, the CPU 34 of the game apparatus 10 transmits the block address decided in the step S21 to the server 102. In response thereto, the CPU of the server 102 generates a dsCHG_MODE command in a step S29. The dsCHG_MODE command is a transition command for making a transition from the DL secure mode to the download mode. The transition command is generated by utilizing the random number and the unique ID acquired in the step S15 and the block address received in the step S29. Here, the random number and the unique ID are utilized for authentication in the memory controller 62, and by the block address, the block address where the download data is to be written is designated.

Figure 17:
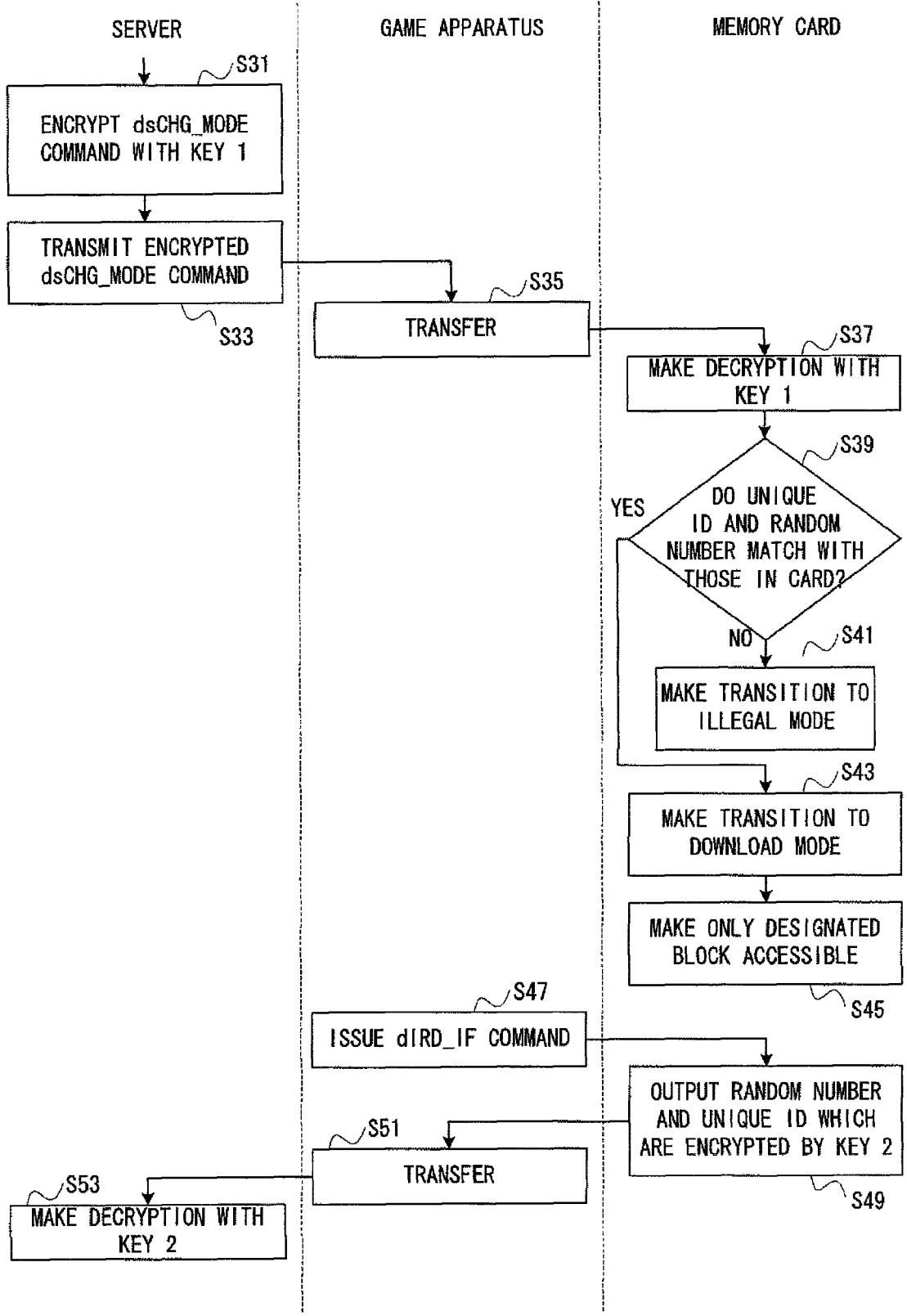
FIG. 17 is a flowchart showing a part of the sequel to FIG. 16.

Succeedingly, in a step S31 in FIG. 17, the CPU of the server 102 encrypts the generated dsCHG_MODE command with the key 1. Then, in a step S33, the CPU of the server 102 transmits the encrypted dsCHG_MODE command to the game apparatus 10. The CPU 34 of the game apparatus 10 transfers the received data to the memory card 28 in a step S35. The memory controller 62 receives the data, and decrypts the received data with the key 1 in a step S37. Thus, from the dsCHG_MODE command, the random number and the unique ID can be acquired, and the designated block address can also be acquired.

The memory controller 62 determines whether or not the unique ID and the random number which are acquired from the command match with the random number and the unique in the memory card 28 in a step S39. If "NO" in the step S39, that is, if the received command is not the authorized command, the memory controller 62 makes a transition to the illegal mode in a step S41. This hinders the download processing from advancing to thereby prevent the unauthorized download from being performed.

Alternatively, if "YES" in the step S39, that is, if the received command is the authorized command, the memory controller 62 makes a transition to the download mode in a step S43, and makes only the designated block accessible in a step S45. This makes it possible to perform writing to the block designated by the transition command to the download mode. Furthermore, at this time, the key 2 for download mode is decrypted and developed in the internal RAM 66.

Furthermore, in a step S47, the CPU 34 of the game apparatus 10 issues a dlRD_IF command to the memory card 28. The dlRD_IF command is a command for reading the random number and the unique ID. In response to the command, the memory controller 62 encrypts the random number and the unique ID with the key 2, and outputs the same to the game apparatus 10 in a step S49. The CPU 34 of the game apparatus 10 receives the data and transfers the received data to the server 102 in a step S51. In response thereto, the CPU of the server 102 receives the data, and decrypts the data by using the key 2 in a step S53. Thus, the server 102 acquires the random number and the unique ID from the memory card 28. The random number and the unique ID are used later as initial values when an MIC of the data to be downloaded is calculated, and are also used as initial values for encryption of the data to be transmitted from server 102.

Figure 18:
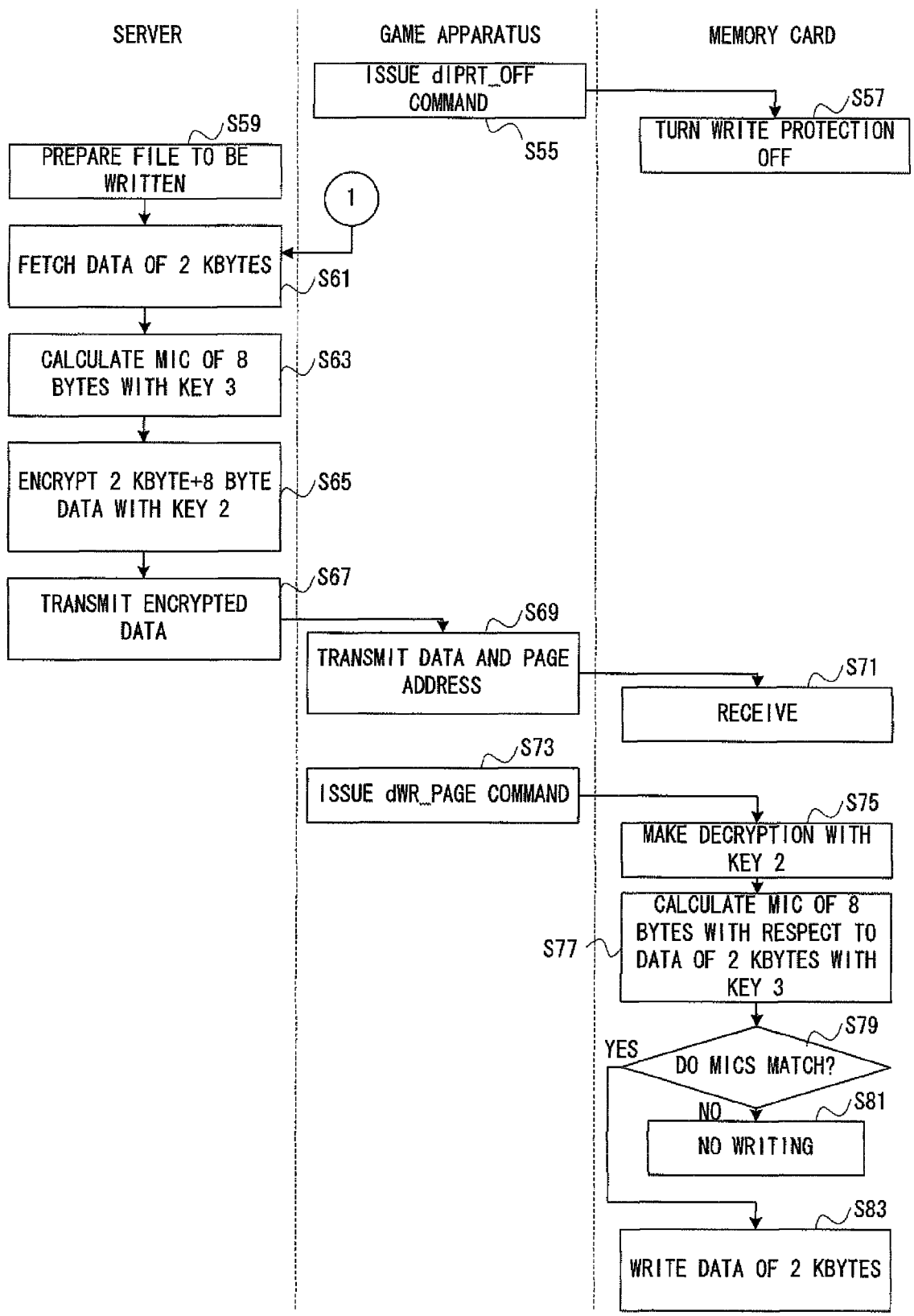
FIG. 18 is a flowchart showing a part of the sequel to FIG. 17.
Figure 19:
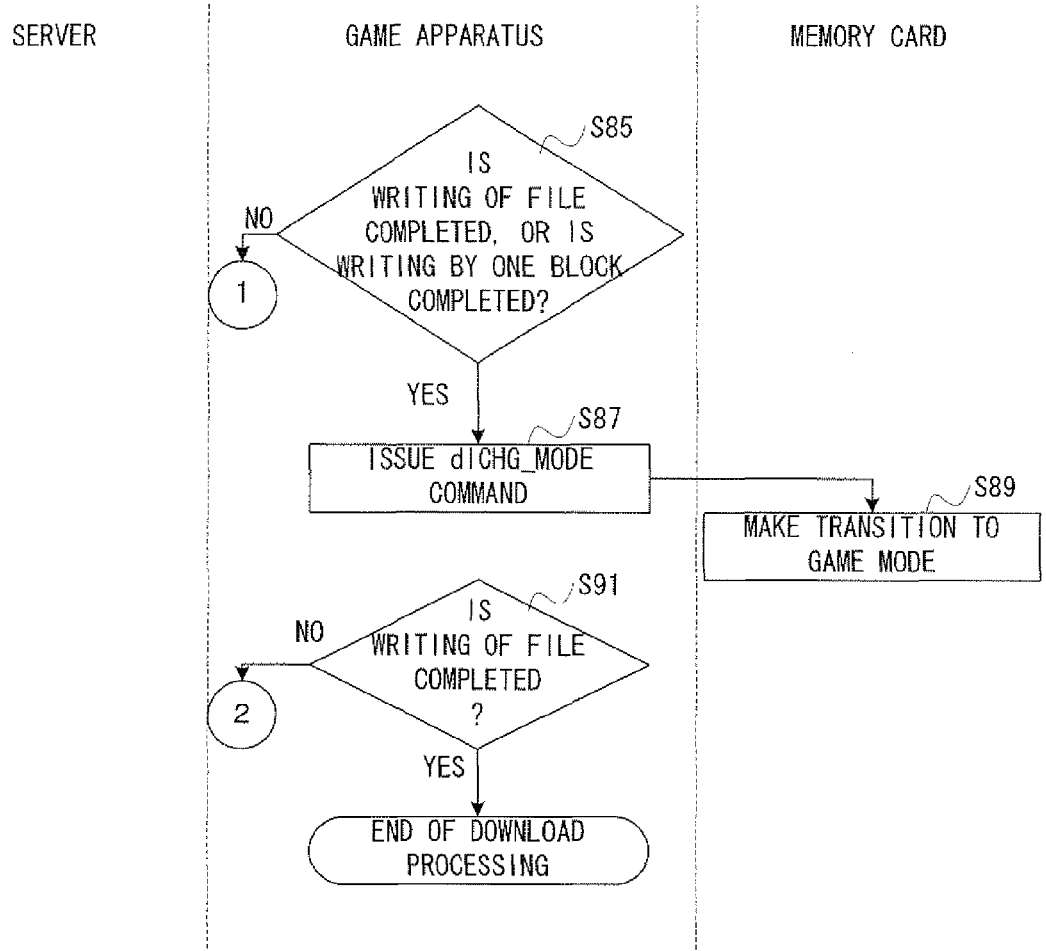
FIG. 19 is a flowchart showing a part of the sequel to FIG. 18.

In addition, in a step S55 in FIG. 18, the CPU 34 of the game apparatus 10 issues a dlPRT_OFF command to the memory card 28. The dlPRT_OFF command is a command for canceling the write protection. In response to the command, the memory controller 62 turns the write protection off, making it possible to execute writing to the designated block of the download area 204.

Succeedingly, in a step S59, the CPU of the server 102 prepares data to be downloaded, that is, a write file. Then, in a step S61, the CPU of the server 102 fetches data of a predetermined size (2 kbytes in this embodiment) from the write file. The transmission of the write file from the server 102 to the game apparatus 10 (to the memory card 28) is performed by the predetermined size.

Then, in a step S63, the CPU of the server 102 calculates an MIC of a predetermined size (8 bytes in this embodiment) from the data of 2 kbytes by using the key 3. As an initial value for the calculation of the MIC, the random number and the unique ID which are acquired in the step S53 are used. In addition, the CPU of the server 102 generates data obtained by adding the MIC of 8 bytes to the data of 2 kbytes, and encrypts the generated data with the key 2 in a step S65. Here, as an initial value for the encryption, the random number and the unique ID which are acquired in the step S53 are used. Then, in a step S67, the CPU of the server 102 transmits the encrypted data to the game apparatus 10.

In response thereto, in a step S69, the CPU 34 of the game apparatus 10 transmits a page address to be written together with the received data to the memory card 28. In response thereto, in a step S71, the memory controller 62 receives the data.

Succeedingly, in a step S73, the CPU 34 of the game apparatus 10 issues a dWR_PAGE command to the memory card 28. The dWR_PAGE command is a command for writing the data transmitted to the memory card 28 to the download area 204. In response to the command, the memory controller 62 decrypts the received data received in the step S71 with the key 2 in a step S75. Thus, the data obtained by adding the MIC of 8 bytes to the data of 2 kbytes can be acquired.

In addition, in a step S77, the memory controller 62 calculates an MIC of 8 bytes with respect to the acquired data of 2 kbytes with the key 3. When the MIC is calculated, the random number and the unique ID which are transmitted in the step S49 are utilized as initial values.

Then, in a step S79, the memory controller 62 determines whether or not the calculated MIC and the MIC acquired through the decryption match with each other. If "NO" in the step S79, that is, if the authorized download data is not received, the memory controller 62 does not perform writing in a step S81. Thus, unauthorized data is not written to the download area 204.

On the other hand, if "YES" in the step S79, that is, if the authorized data is received, the memory controller 62 writes the received data of 2 kbytes to the designated block of the download area 204 in a step S83.

Succeedingly, the CPU 34 of the game apparatus 10 determines whether or not writing of the file is completed or writing by one block is completed in a step S85. In the download mode of this embodiment, within a fixed range (one block in this embodiment) from the designated block address, it is possible to write data without the transition command from the server 102. Accordingly, until the writing by one block is completed, or until data less than one block of the writing file is completed, operations of transmitting the encrypted data by the CPU of the server 102, and decrypting the data and writing the same by the memory controller 62 are repeatedly performed. That is, if "NO" in the step S85, the process returns to the step S61 in FIG. 18. Thus, making the use of the transition command from the server 102 unnecessary as to the writing within the fixed range offers advantages of capable of reducing the load of the server 102, and shortening the processing on the side of the game apparatus 10 as well.

On the other hand, in a case that file writing by one block or more has to be performed, after ending the download mode once, the process makes a transition to the game mode. The transition command is transmitted from the server 102 again to change the mode of the memory controller 62 to the download mode, and then, downloading the data is performed.

That is, if "YES" in the step S85, the CPU 34 of the game apparatus 10 issues a dlCHG_MODE command to the memory card 28 in a step S87. The dlCHG_MODE command is a transition command for making a transition from the download mode to the game mode. In response thereto, the memory controller 62 makes a transition to the game mode in a step S89.

In addition, the CPU 34 of the game apparatus 10 determines whether or not the writing of the file is completed in a step S91. If "NO" in the step S91, that is, if there is unwritten data in the write file, the process returns to the step S9 in FIG. 16 to repeat the processing from the game mode. On the other hand, if "YES" in the step S91, that is, if all data of the write file is written, the download processing is ended.

Succeedingly, an operation of each of the game apparatus 10, the memory controller 62 and the server 102 in the download processing is explained.

Figure 20:
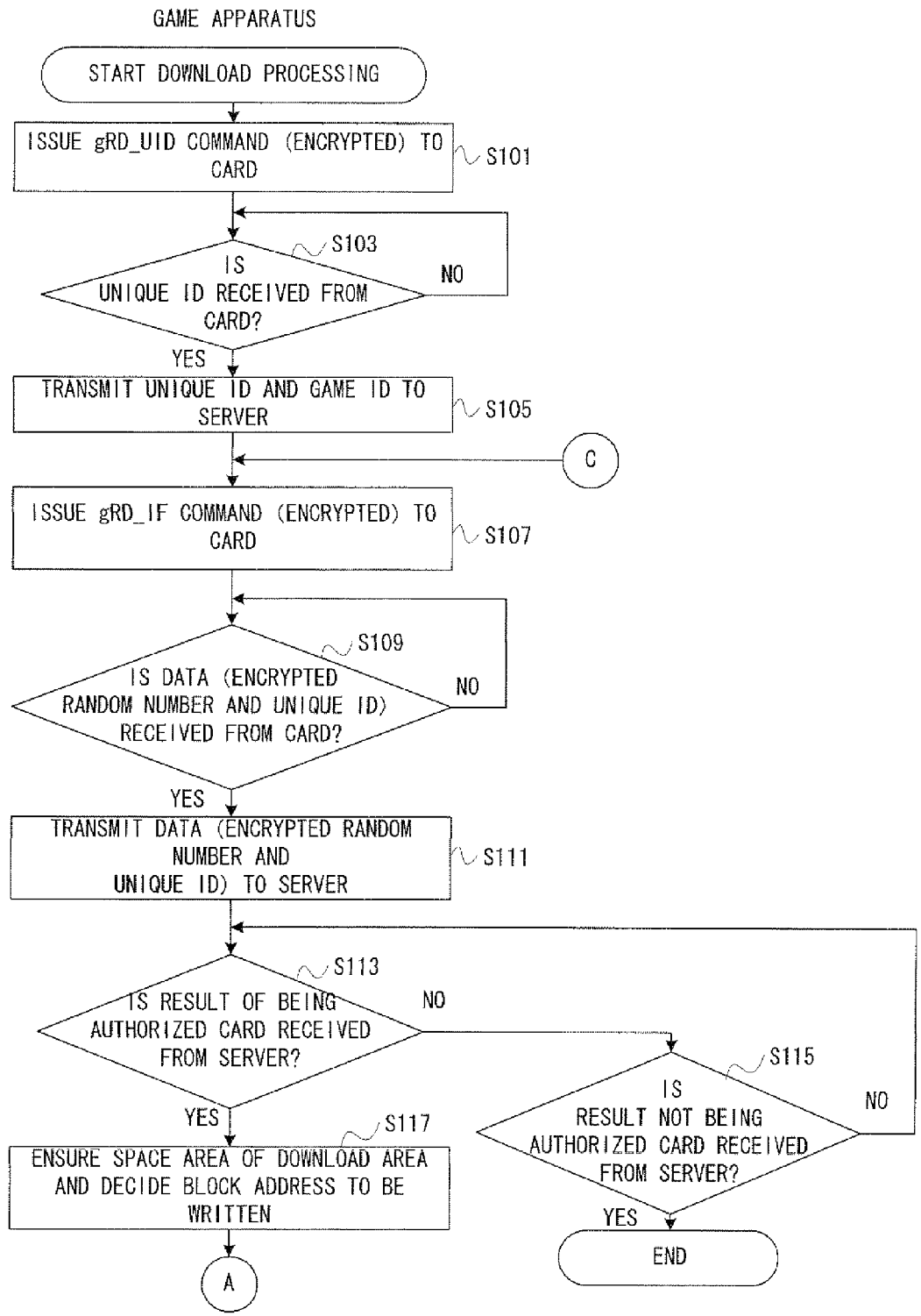
FIG. 20 is a flowchart showing a part of one example of an operation of the game apparatus at a time of the download processing.
Figure 21:
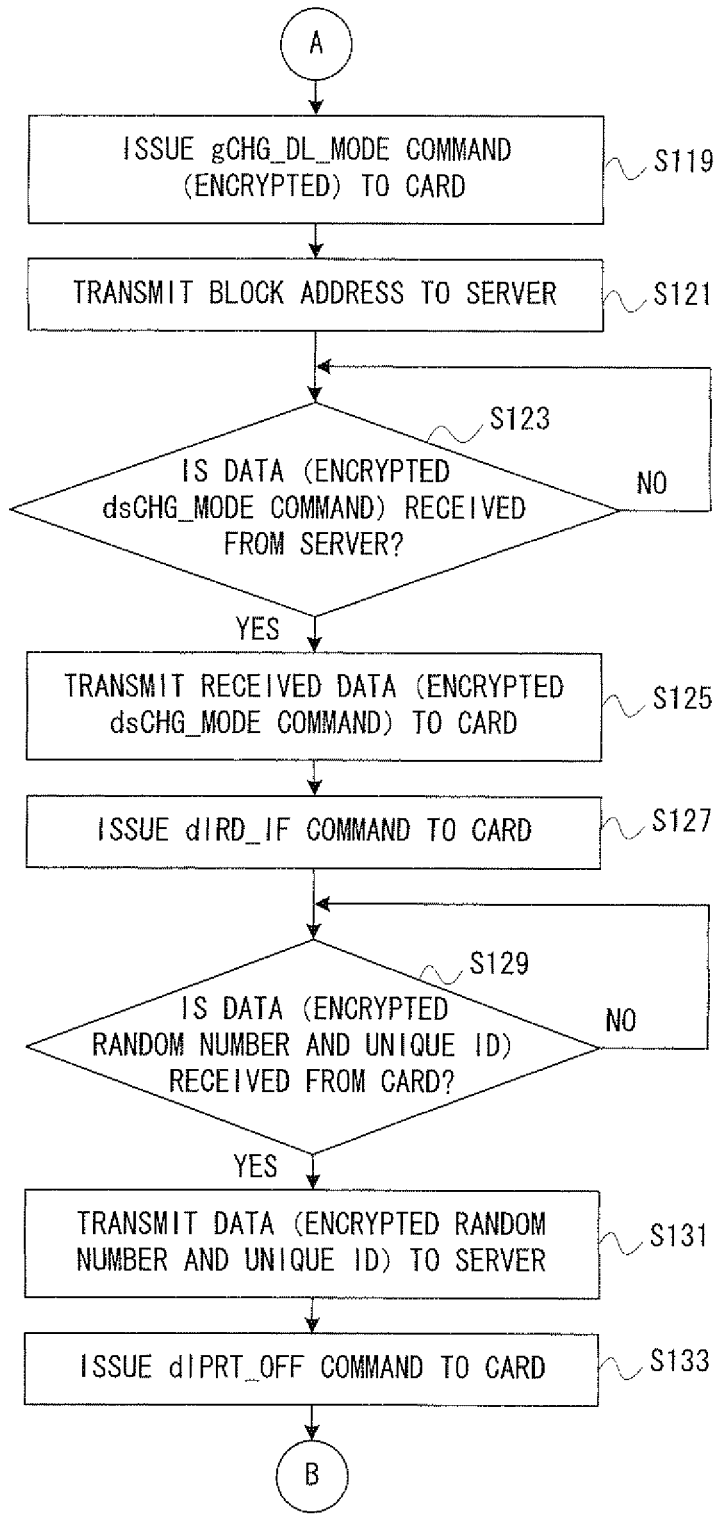
FIG. 21 is a flowchart showing a part of the sequel to FIG. 20.
Figure 22:
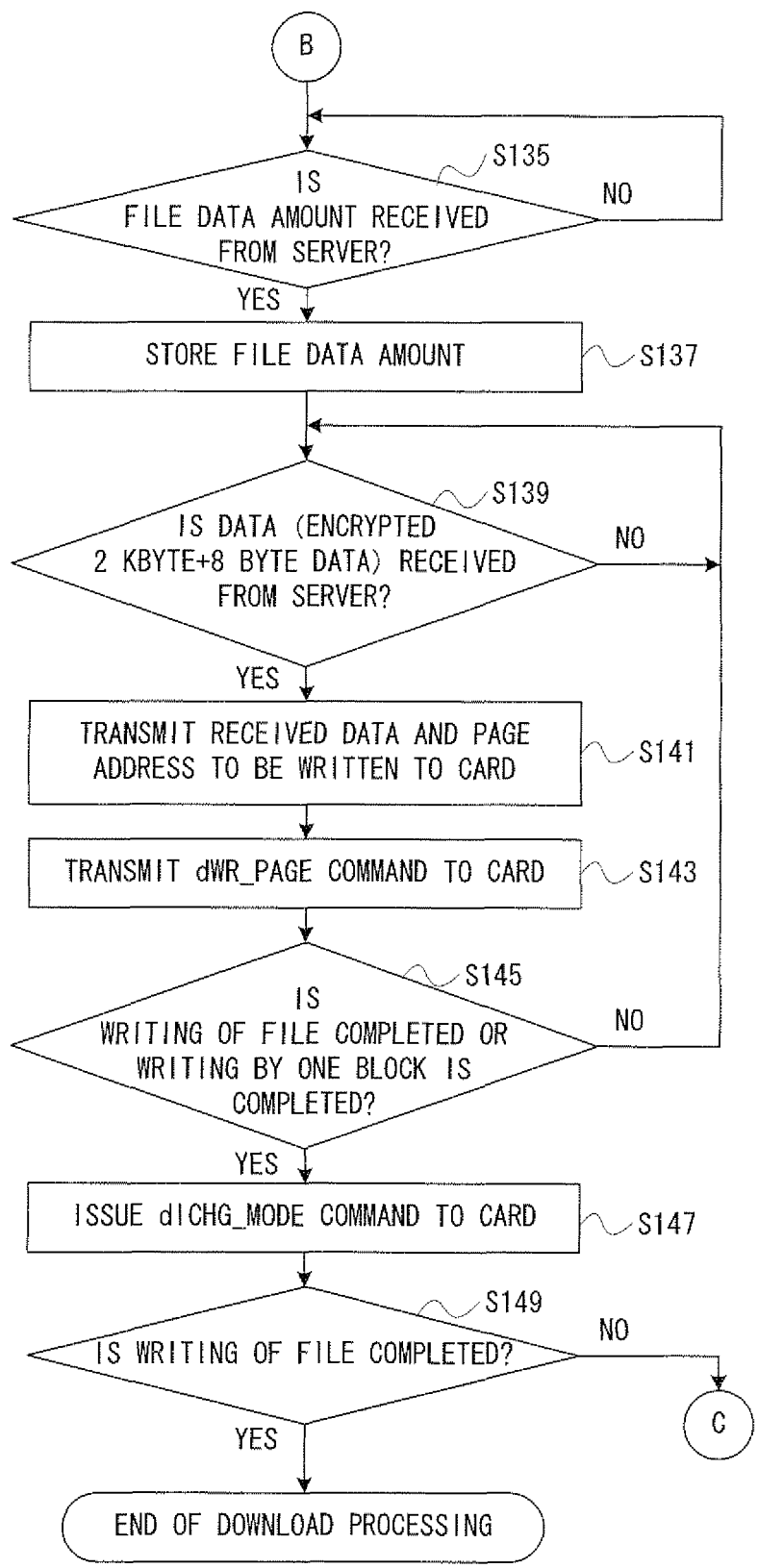
FIG. 22 is a flowchart showing the sequel to FIG. 21.

FIG. 20 to FIG. 22 show one example of an operation of the game apparatus 10 in the download processing. When starting the download processing, in a step S101 shown in FIG. 20, the CPU 34 issues a gRD_UID command to the memory card 28. The gRD_UID command is a command for reading a unique ID. Furthermore, the gRD_UID command is issued when the memory controller 62 is in the game mode, so that this may be encrypted by an algorithm of a relatively low processing load (scramble, for example) and output to the memory card 28.

When a command and data are transmitted from the game apparatus 10 to the memory card 28, the CPU 34 applies the command and the data to the connector 32, and then, the command and the data are applied to the memory controller 62 via the connector 60.

Next in a step S103, the CPU 34 determines whether or not the unique ID is received from the memory card 28. In response to the gRD_UID command, the memory controller 62 returns the unique ID, and thus, reception of the data from the memory controller 62 via the connector 32 is waited.

If "YES" in the step S103, that is, if the unique ID from the memory controller 62 is received, the CPU 34 transmits the unique ID and the game ID to the server 102 in a step S105. More specifically, the received unique ID is stored in the data memory area 502 of the RAM 42 and the game ID stored in the memory area 504 is read, whereby the data including the unique ID and the game ID is transmitted.

It should be noted that when the data is transmitted from the game apparatus 10 to the server 10, the CPU 34 applies the data to the wireless communication portion 58, and then, the data is applied from the wireless communication portion 58 to the server 102 via the access point 104 and the network 106.

Succeedingly, the CPU 34 issues a gRD_IF command to the memory card 28 in a step S107. Here, the gRD_IF command is a command for reading the random number and the unique ID. The gRD_IF command may also be encrypted by an algorism of a relatively low processing load like scramble and may be transmitted. Then, in a step S109, the CPU 34 determines whether or not the data (encrypted random number and unique ID) is received from the memory card 28. In response to the gRD_IF command, the memory controller 62 returns the aforementioned data, and thus reception of the data is waited.

If "YES" in the step S109, that is, if the data from the memory controller 62 is received, the CPU 34 transmits the received data (encrypted random number and unique ID) to the server 102 in a step S111.

Succeedingly, in steps S113 and S115, it is determined whether or not the result as to whether or not the memory card 28 is an authorized card is received from the server 102 via the wireless communication portion 58. The server 102 returns the result of the authentication of the memory card 28 in response to the data transmission in the step S111, and thus reception of the data from the server 102 is waited. More specifically, in the step S113, the CPU 34 determines whether or not the fact that the memory card 28 is an authorized card is received from the server 102. If "NO" in the step S113, the CPU 34 determines whether or not the fact that the memory card 28 is not an authorized card is received in the step S115. If "NO" in the step S115, the process returns to the step S113.

If "YES" in the step S115, that is, if it is regarded that an unauthorized memory card 28 is attached, the download processing is ended. Thus, it is possible to avoid downloading to the unauthorized memory card 28.

On the other hand, if "YES" in the step S113, that is, if it is assumed that the authorized memory card 28 is attached, the CPU 34 ensures a space area of the download area 204 and decides the block address to be written in a step S117. Information about which area out of the memory area of the flash memory 64 is used, or which area is a space area is stored in the information area 200 as header information, for example. Thus, the CPU 34 generates management data of the flash memory 64 on the basis of the header information, ensures the space area on the basis of the management data, and decides the block address to be written. The decided block address is stored in the memory area 506. After completion of the step S117, the process proceeds to a step S119 in FIG. 21.

In the step S119 in FIG. 21, the CPU 34 issues a gCHG_DL_MODE command to the memory card 28. The gCH- G_DL_MODE command is a transition command for making a transition to the DL secure mode. Here, the gCHG_DL_MODE command may be encrypted according to an algorithm of a relatively low processing load such as a scramble so as to be transmitted. Succeedingly, in a step S121, the CPU 34 transmits the block address decided in the step S117 to the server 102.

Then, in a step S123, the CPU 34 determines whether or not the data (encrypted dsCHG_MODE command) is received from the server 102. In response to the transmission in the step S121, the server 102 returns the data, and thus, reception of the data is waited.

If "YES" in the step S123, that is, if receiving the aforementioned data, the CPU 34 transmits the received data (encrypted dsCHG_MODE command) to the memory card 28 in a step S125. Thus, the memory controller 62 makes a transition to the download mode.

In addition, in a step S127, the CPU 34 issues a dlRD_IF command to the memory card 28. The dlRD_IF command is a command for reading the random number and the unique ID. Then, in a step S129, the CPU 34 determines whether or not the data (encrypted random number and unique ID) is received from the memory card 28. In response to the dlRD_IF command, the memory controller 62 returns the encrypted random number and unique ID, and reception of the data is waited.

If "YES" in the step S129, that is, if the aforementioned data is received, the CPU 34 transmits the received data (encrypted random number and unique ID) to the server 102 in a step S131.

Succeedingly, in a step S133, the CPU 34 issues a dlPRT_OFF command to the memory card 28. The dlPRT_OFF command is a command for canceling the write protection. After completion of the step S133, the processing proceeds to a step S135 in FIG. 22.

In the step S135 shown in FIG. 22, the CPU 34 determines whether or not data about the amount of file data is received from the server 102. In response to the data transmission in the step S131, the server 102 prepares data to be downloaded (write file), and transmits the amount of file data first, and thus, reception of the amount of file data is waited in the step S135. If "YES" in the step S135, the CPU 34 stores the received amount of file data in the memory area 508 in a step S137.

Succeedingly, in a step S139, the CPU 34 determines whether or not data (encrypted data of 2 kbytes+8 bytes) is received from the server 102. Here, after transmitting the amount of file data, the server 102 transmits the data from the write file by a predetermined size. More specifically, the server 102 encrypts the data obtained by adding the MIC of 8 bytes to the data of 2 kbytes and transmits the same, and thus, reception of the data is waited in the step S139.

If "YES" in the step S139, that is, if the aforementioned data is received, the CPU 34 transmits a page address to be written with the received data to the memory card 28 in a step S141. Here, the data is transmitted by a predetermined size from the server 102, and thus the CPU 34 can decide a page address where the data is to be written on the basis of the management data of the flash memory 64, the block address, etc. every time that the data is received. In a succeeding step S143, the CPU 34 issues a dWR_PAGE command to the memory card 28. The dWR_PAGE command is a command for instructing the memory card 28 to write the transmitted data in the step S141 to the designated page address.

Then, in a step S145, the CPU 34 determines whether or not the writing of the file is completed, or the writing by one block is completed. As described above, the data is transmitted by a predetermined size from the server 102, and thus, the CPU 34 can calculate the amount of written data (amount of data transmitted to the memory card 28). Accordingly, the CPU 34 can determine whether or not the amount of written data reaches the amount of file data or one block. If "NO" in the step S145, the processing returns to the step S139, and until the writing of the file data is completed, or until the writing by one block is completed, the writing the data is repeated.

On the other hand, if "YES" in the step S145, the CPU 34 issues a dlCHG_MODE command to the memory card 28 in a step S147. The dlCHG_MODE command is a transition command for making a transition from the download mode to the game mode. Then, in a step S149, the CPU 34 determines whether or not writing of the file data is completed. If "NO" in the step S149, that is, if writing by one block is completed, but writing of all the write file has not been completed, the process returns to the step S107 in FIG. 20, and the processing from the step S107 in the game mode is performed again for writing the rest of the data. On the other hand, if "YES" in the step S149, the download processing is ended.

FIG. 23 to FIG. 26 show one example of an operation of the memory controller 62 in the download processing. Additionally, as described above, the download processing is started in the game mode, and thus, the processing from when the power is turned on to when the memory controller 62 is placed in the game mode is described as steps S201 to S205 in FIG. 23.

Figure 23:
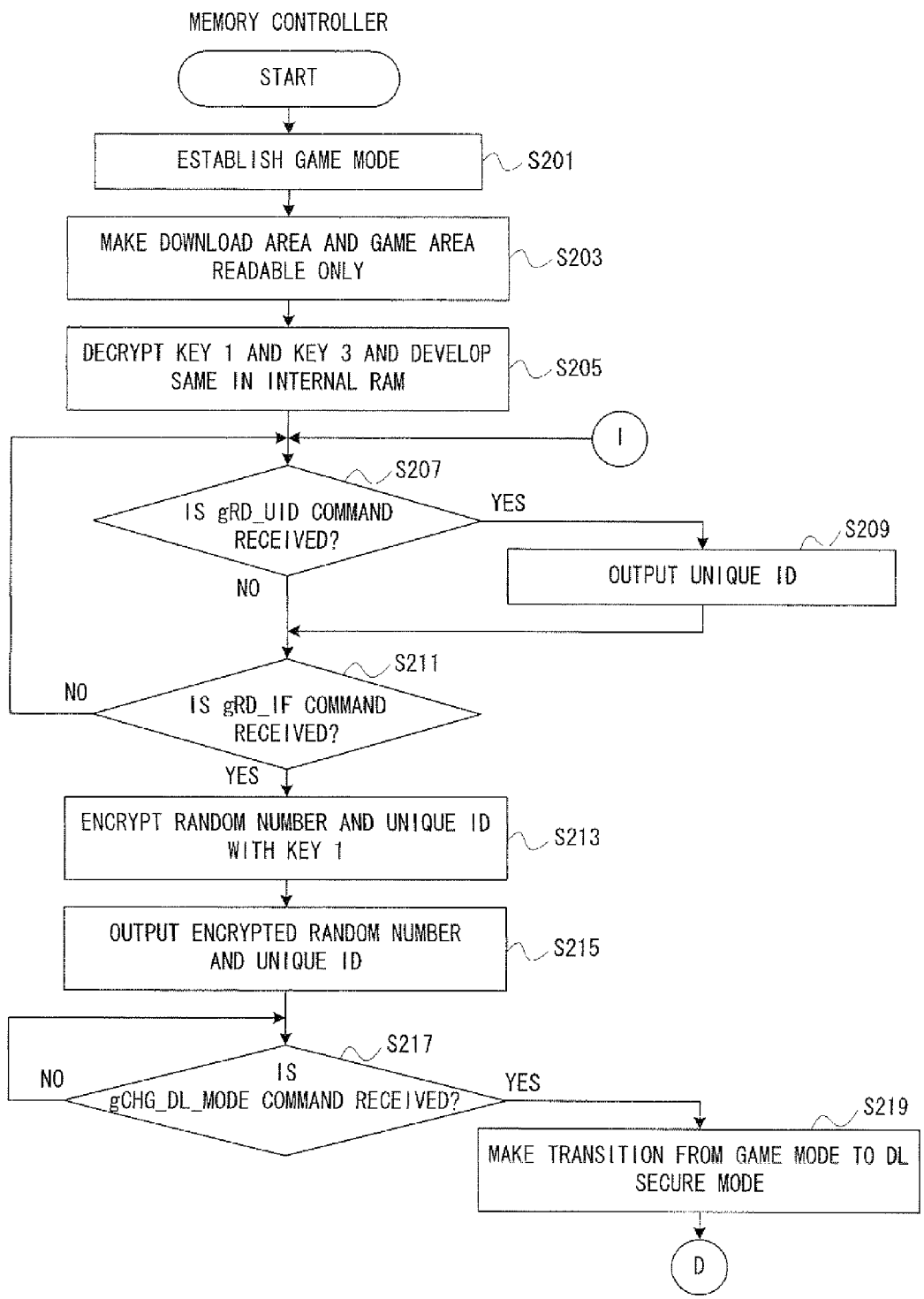
FIG. 23 is a flowchart showing a part of one example of an operation of the memory controller at a time of the download processing.

When starting the process, the memory controller 62 sets the mode to the game mode in the step S201 shown in FIG. 23. In a mode memory area 300 of the internal RAM 66, data indicating the game mode is stored.

Next, in the step S203, the memory controller 62 makes the download area 204 and the game area 202 readable only. For example, the memory controller 62 generates data indicating accessibility to each area of the flash memory 64 in the internal RAM 66. Then, in the data, data indicating that only reading is possible with respect to the download area 204 and the game area 202 is set.

Succeedingly, in the step S205, the memory controller 62 reads the key 1 and the key 3 from the information area 200 of the flash memory 64 to the work area of the internal RAM 66 and decrypts the same, and develops the key 1 and the key 3 in the key memory area 302.

The processing after a step S207 onward corresponds to the download processing by the memory controller 62. The memory controller 62 determines whether or not the gRD_UID command is received via the connector 60 in the step S207. If "YES" in the step S207, that is, if the command for reading the unique ID is received, the memory controller 62 reads the unique ID from the memory area 220 of the information area 200, and outputs the unique ID to the connector 60 in a step S209. Here, if the gRD_UID command is encrypted through scrambling, etc. and then transmitted, after the received data is decrypted, it is determined whether or not the data is the gRD_UID command. Furthermore, the data output to the connector 60 by the memory controller 62 is applied to the CPU 34 via the connector 32, etc.

If the step S209 is ended, or if "NO" in the step S207, the memory controller 62 determines whether or not the gRD_IF command is received in a step S211. Here, if the gRD_IF command is encrypted through scrambling, after the received data is decrypted, it is determined whether or not the data is the gRD_IF command. If "NO" in the step S211, the process returns to the step S207.

On the other hand, if "YES" in the step S211, that is, if the command for reading the random number and the unique ID is received, the memory controller 62 encrypts the random number and the unique ID with the key 1 in a step S213. Here, the memory controller 62 generates the random number to the memory area 304, and the memory controller 62 further reads the unique ID from the memory area 220 of the information area 200 to the work area. Here, the key 1 to be utilized in the encryption has already been developed in the memory area 302. In a succeeding step S215, the memory controller 62 outputs the encrypted random number and unique ID.

Succeedingly, in a step S217, the memory controller 62 determines whether or not the gCHG_DL_MODE command is received. The gCHG_DL_MODE command is issued from the CPU 34 in a case that it is determined that the memory card 28 is an authorized card in the server 102, and thus, in the step S217, reception of the command is waited. Furthermore, if the gCHG_DL_MODE command is encrypted through scrambling, etc., after the received data is decrypted, it is determined whether or not the data is the gCHG_DL_MODE command.

If "YES" in the step S217, that is, if the transition command to the DL secure mode is received, the memory controller 62 makes a transition from the game mode to the DL secure mode in a step S219. In the mode memory area 300, data indicating the DL secure mode is stored.

Figure 24:
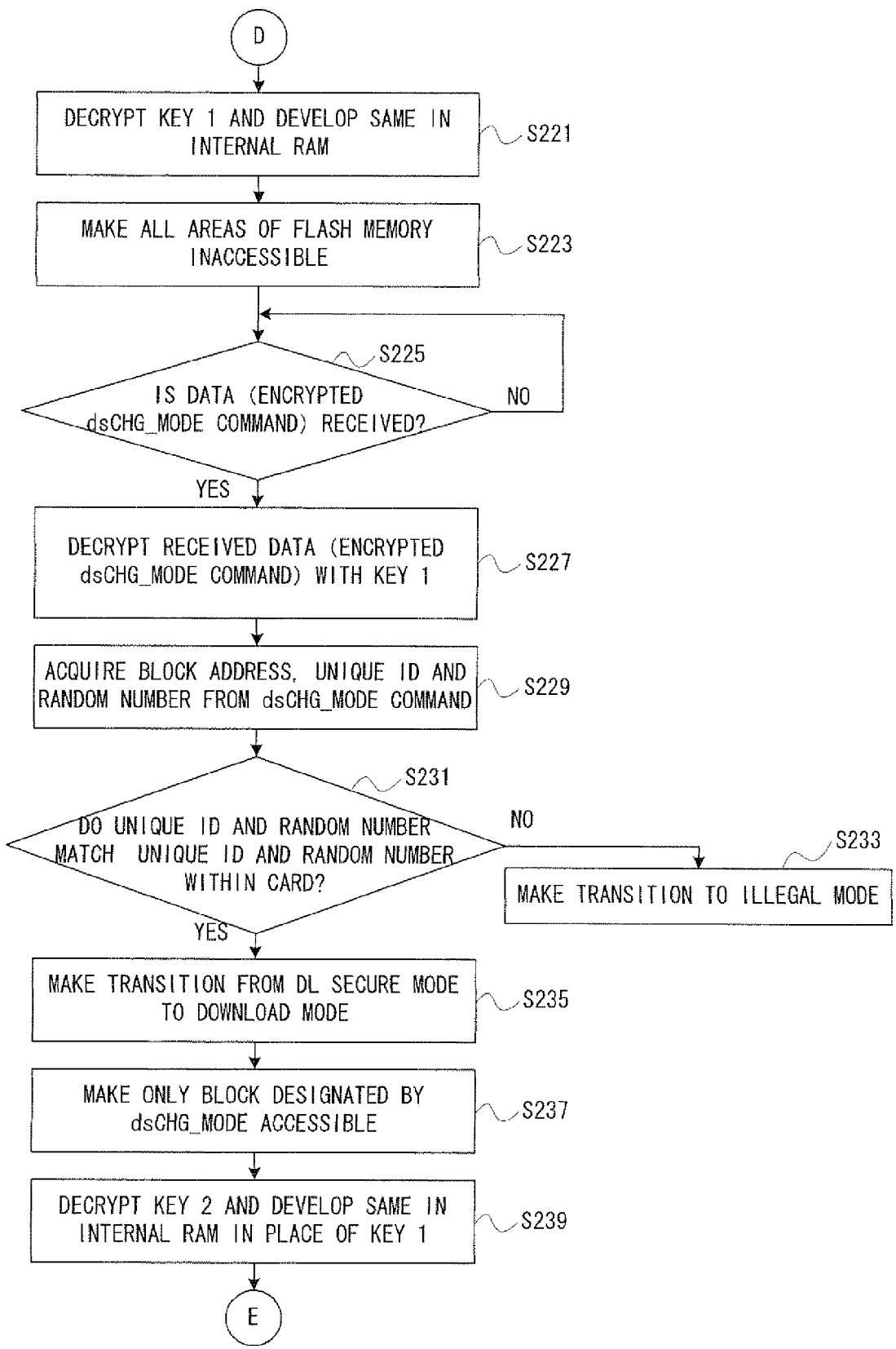
FIG. 24 is a flowchart showing a part of the sequel to FIG. 23.

Succeedingly, in a step S221 shown in FIG. 24, the memory controller 62 reads the key 1 from the memory area 214 of the information area 200 and decrypts the same, and develops the decrypted one in the memory area 302 of the internal RAM 66. Here, in the key memory area 302, the key 1 has already been developed, but in order to prevent the data from being replaced in an accident, the key 1 is developed again in the processing in the step S221.

Furthermore, in a step S224, the memory controller 62 makes all the areas of the flash memory 64 inaccessible. For example, the memory controller 62 sets data indicating that access is made impossible with respect to all the areas in the data indicating accessibility to each area of the flash memory 64.

Then, in a step S225, the memory controller 62 determines whether or not the data (encrypted dsCHG_MODE command) is received. After a transition to the DL secure mode is made, the encrypted dsCHG_MODE command is transmitted from the server 102, and thus, in the step S225, reception of the data is waited.

If "YES" in the step S225, that is, if the data (encrypted dsCHG_MODE command) is received, the memory controller 62 decrypts the received data with the key 1 in a step S227. The dsCHG_MODE command is encrypted by the key 1 corresponding to the unique ID of the memory card 28 in the server 102, and thus is decrypted by using the key 1 of the memory area 302.

Succeedingly, in a step S229, the memory controller 62 acquires the block address, the unique ID and the random number from the dsCHG_MODE command. In the dsCHG_MODE command, the block address where the downloaded data is to be written is designated, and the random number and the unique ID which are previously output in the step S215 are embedded.

Then, in a step S231, the memory controller 62 determines whether or not the acquired unique ID and random number match with the unique ID and the random number within the memory card 28, that is, the unique ID stored in the internal RAM 66 and the random number stored in the memory area 304.

If "NO" in the step S231, that is, if the transition command to the download mode is not the authorized command, the memory controller 62 makes a transition to the illegal mode in a step S233. In the mode memory area 300, data indicating the illegal mode is stored. When a transition to the illegal mode is made, the memory controller 62 does not perform the download processing, capable of preventing unauthorized writing from being performed.

On the other hand, if "YES" in the step S231, that is, if the transition command to the download mode is the authorized command, the memory controller 62 makes a transition from the DL secure mode to the download mode in a step S235. In the mode memory area 300, data indicating the download mode is stored.

Furthermore, in a step S237, the memory controller 62 makes only the block designated by the dsCHG_MODE command accessible. For example, the memory controller 62 changes the memory map of the download area to the designated block only and sets the data indicating that access is made possible with respect to only the download area to the data indicating accessibility to each area of the flash memory 64.

In addition, in a step S239, the memory controller 62 reads the key 2 from the memory area 216 of the information area 200 and decrypts the same, and develops the decrypted one in the memory area 302 of the internal RAM 66 in place of the key 1. Here, before the key 2 is developed, the key 1 is erased from the key memory area 302.

Figure 25:
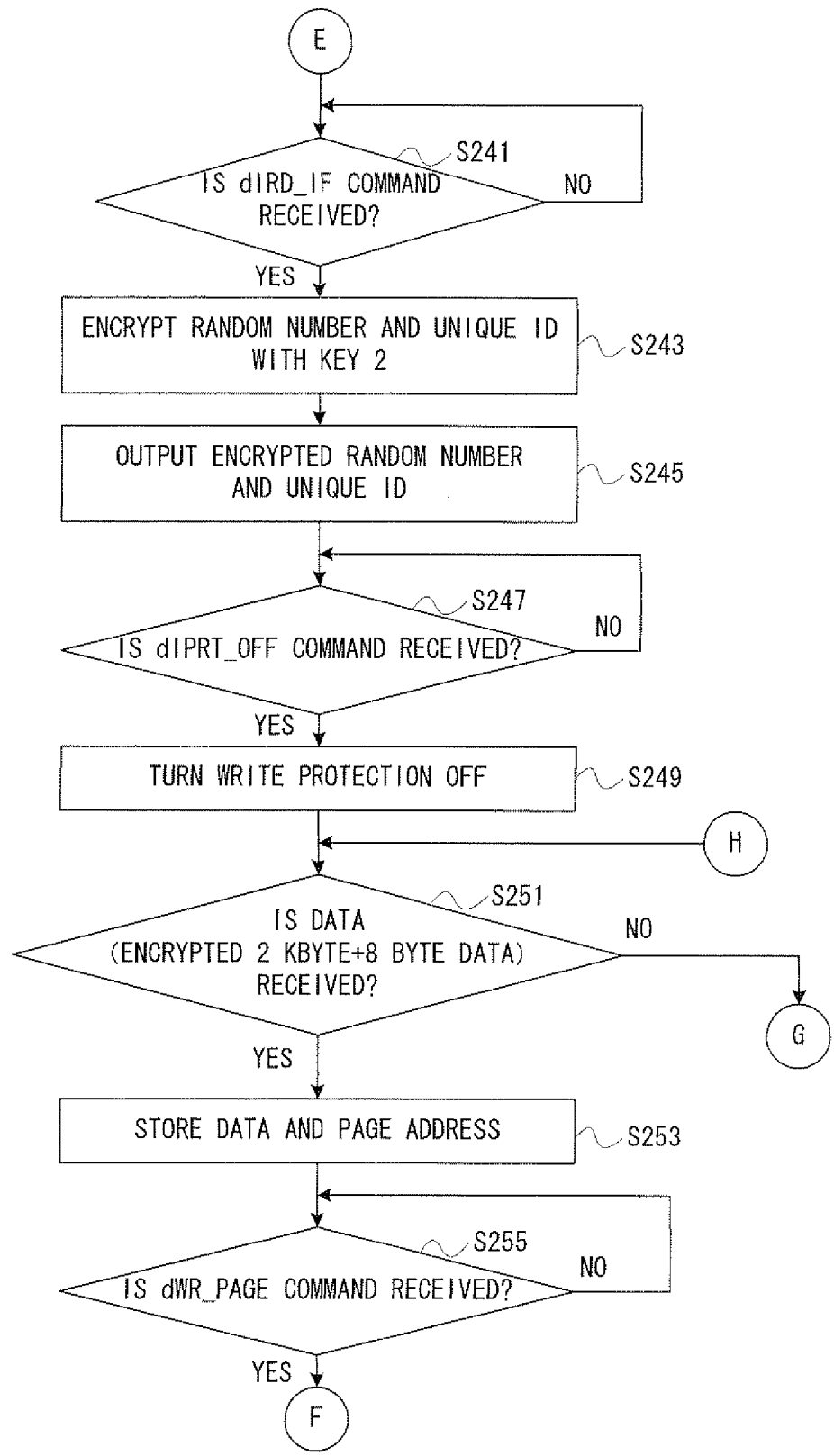
FIG. 25 is a flowchart showing a part of the sequel to FIG. 24.

Succeedingly, in a step S241 in FIG. 25, the memory controller 62 determines whether or not the dlRD_IF command is received. The dlRD_IF command is issued by the CPU 34 after the encrypted dsCHG_MODE command is transferred, and thus, reception of the dlRD_IF command is waited in the step S241.

If "YES" in the step S241, that is, if the command for reading the random number and the unique ID is received, the memory controller 62 encrypts the random number and the unique ID with the key 2 in a step S243. Specifically, the memory controller 62 issues the random number to the memory area 304, and reads the unique ID from the memory area 220 of information area 200. Then, the random number and the unique ID are encrypted with the key 2 developed in the memory area 302. In a step S245, the memory controller 62 outputs the encrypted random number and unique ID.

Succeedingly, in a step S247, the memory controller 62 determines whether or not the dlPRT_OFF command is received. The CPU 34 transfers the encrypted random number and unique ID which are output in the step S245 to the server 102, and issues the dlPRT_OFF command, and thus, reception of the command is waited in a step S247.

If "YES" in the step S247, that is, if the command for cancelling the write protection is received, the memory controller 62 turns off the write protection with respect to the download area 204 of the flash memory 64 in a step S249. More specifically, the memory controller 62 turns off the flag indicating the write protection stored in the memory area 306 of the internal RAM 66.

Succeedingly, in a step S251, the memory controller 62 determines whether or not the data (encrypted 2 kbyte+8 byte data) is received. The data is download data transmitted from the server 102. Furthermore, in the reception data, a page address to be written is added by the CPU 34 of the game apparatus 10.

If "YES" in the step S251, the memory controller 62 stores the received data and the page address in the work area of the internal RAM 66 in a step S253. On the other hand, if "NO" in the step S251, the process proceeds to a step S269 shown in FIG. 26.

Succeedingly, in a step S255, the memory controller 62 determines whether or not the dWR_PAGE command is received. As the dWR_PAGE command is issued by the CPU 34 of the game apparatus 10 after transfer of the download data, receiving the dWR_PAGE command is waited in the step S255.

Figure 26:
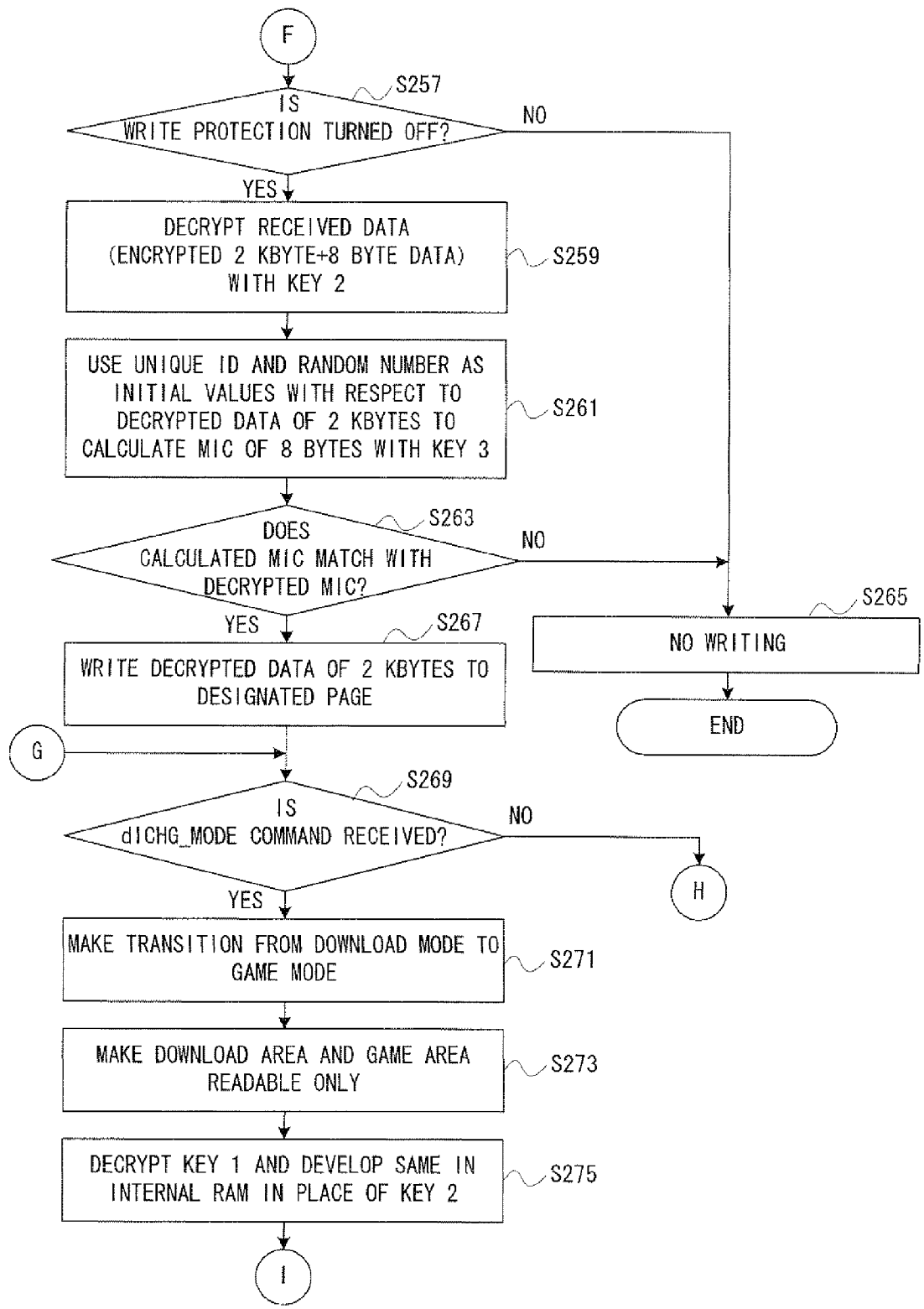
FIG. 26 is a flowchart showing a part of the sequel to FIG. 25.

If "YES" in the step S255, that is, if the writing command is received, the process proceeds to a step S257 shown in FIG. 26. In the step S257, the memory controller 62 determines whether or not the write protection of the memory area 306 is turned off.

If "YES" in the step S257, that is, if the downloaded data is allowed to be written, the memory controller 62 decrypts the received data (encrypted 2 kbyte+8 byte data) with the key 2 in a step S259. Here, the received data is encrypted by the key 2 corresponding to the unique ID of the memory card 28 in the server 102. By the decryption, it is possible to acquire the data of 2 kbytes to be downloaded and the MIC of 8 bytes.

Succeedingly, in a step S261, the memory controller 62 calculates the MIC of 8 bytes with respect to the decrypted data of 2 kbytes with the key 3. Here, when the MIC is calculated, the unique ID and the random number which are stored in the internal RAM 66 are used as initial values. Furthermore, the key 3 for calculation is constructed by the part of the key 2 (common part) stored in the memory area 302 and the key 3.

Then, in a step S263, the memory controller 62 determines whether or not the calculated MIC matches with the decrypted MIC. If "NO" in the step S263, that is, if the downloaded data is identified as unauthorized data, the process proceeds to a step S265. In the step S265, the memory controller 62 does not execute writing. Thus, it is possible to prevent the unauthorized data from being written to the download area 204. After completion of the step S265, the download processing is ended.

On the other hand, if "YES" in the step S263, that is, if the downloaded data is authorized data, the memory controller 62 writes the decrypted data of 2 kbytes in the designated page in a step S267.

Succeedingly, in a step S269, the memory controller 62 determines whether or not the dlCHG_MODE command is received. The dlCHG_MODE command is issued by the CPU 34 when writing of the file is completed or writing by one block is completed. If "NO" in the step S269, the process returns to the step S251 in FIG. 25. Accordingly, until the writing of the file is completed, or until the writing by one block is completed, writing the downloaded data of the predetermined size (2 kbytes) to the download area 204 is repeated.

On the other hand, if "YES" in the step S269, that is, if a transition command to the game mode is received, the memory controller 62 makes a transition from the download mode to the game mode in a step S271. In the mode memory area 300, data indicating the game mode is stored. Furthermore, in a step S273, the memory controller 62 makes the download area 204 and the game area 202 readable only similar to the step S203. Here, the memory map of the download area is changed to the designated block, and thus, the download area 204 is returned to the original condition on the basis of the boundary data (start address) of each area defined in the information area 200, and the data indicating that access is made possible with respect to only the download area is set.

In addition, in a step S275, the memory controller 62 decrypts the key 1 read from the memory area 214 of the information area 200 and develops the same in the key memory area 302 of the internal RAM 66 in place of the key 2. When the step S275 is ended, the process returns to the step S207. In a case that writing of the file to be downloaded is not completed, the download processing is executed from the game mode again to perform writing of the rest of the data.

Figure 27:
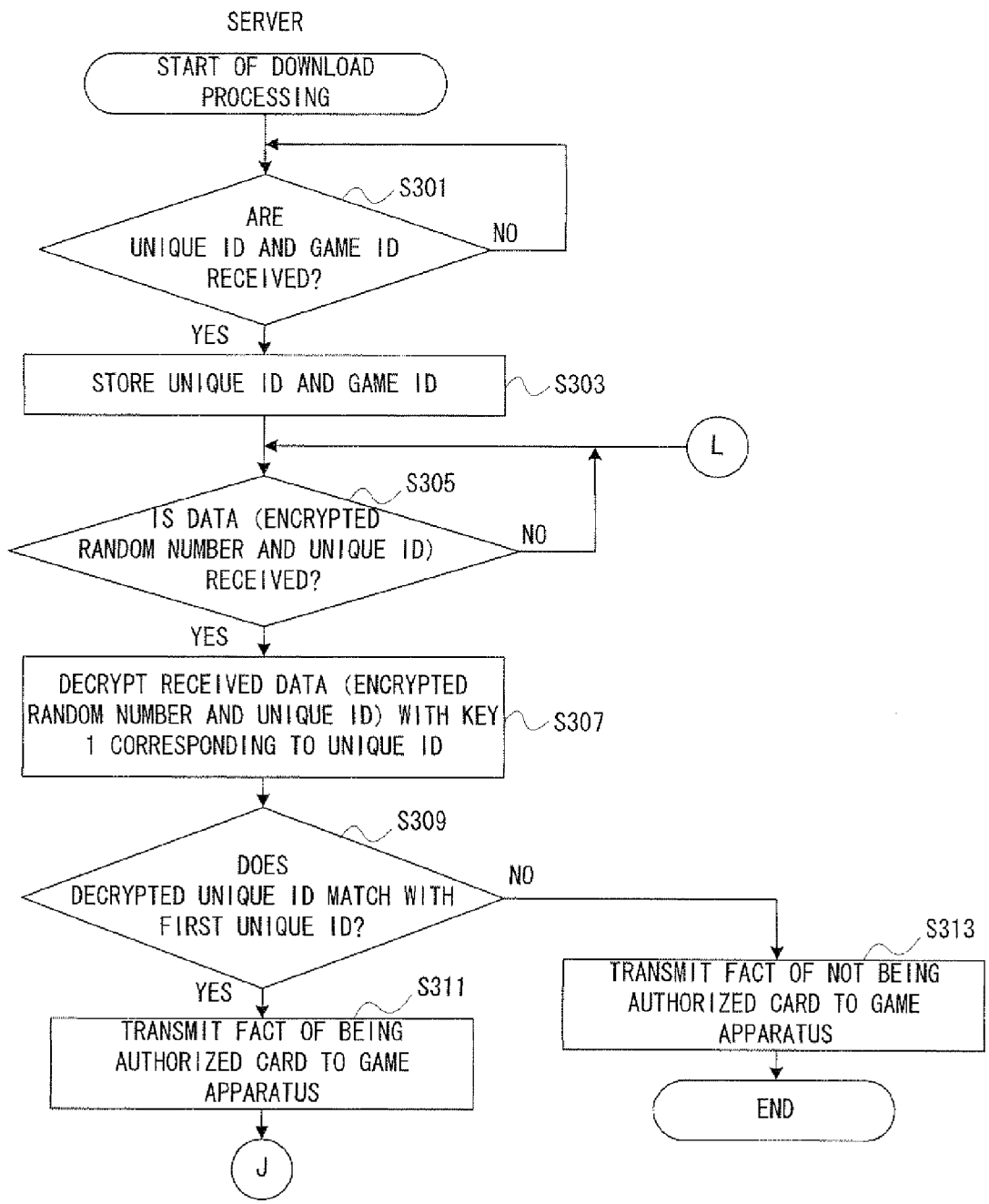
FIG. 27 is a flowchart showing a part of one example of an operation of the server at a time of the download processing.
Figure 28:
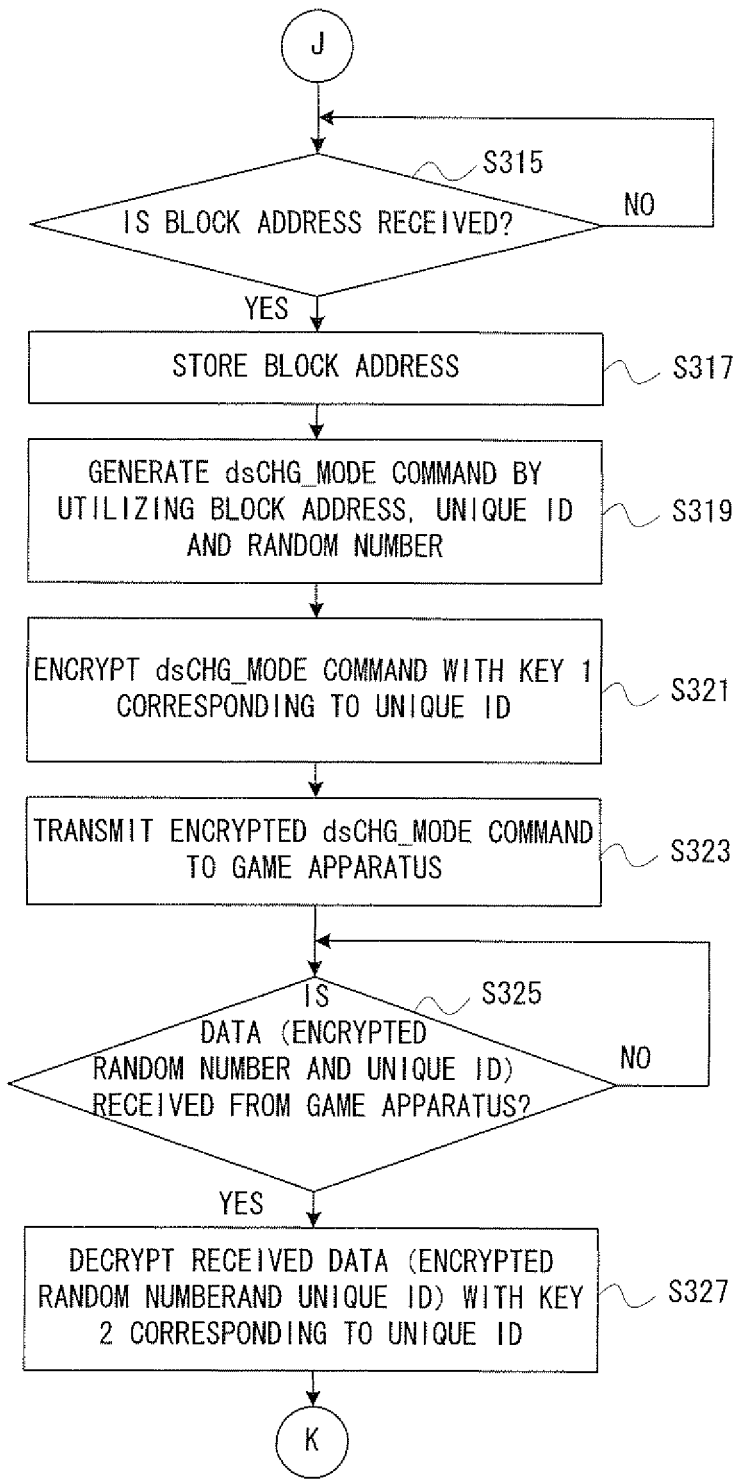
FIG. 28 is a flowchart showing a part of the sequel to FIG. 27.
Figure 29:
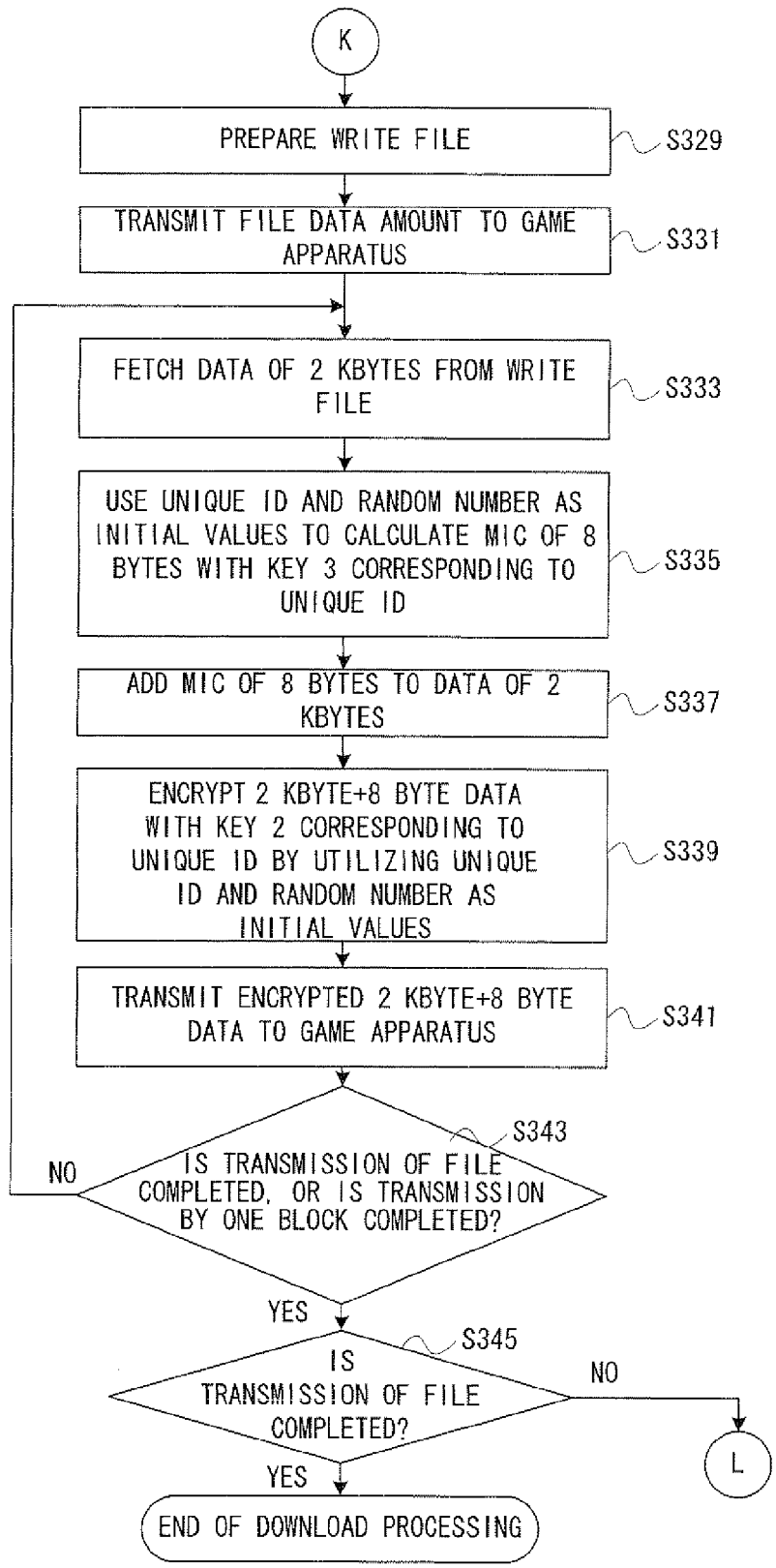
FIG. 29 is a flowchart showing the sequel to FIG. 28.

FIG. 27 to FIG. 29 show one example of an operation of the server 102 in the download processing. When starting the download processing, the CPU of the server 102 determines whether or not the unique ID and the game ID are received in a step S301. In the download processing, the unique ID of the memory card 28 and the game ID are first transmitted from the game apparatus 10 via the network 106, and thus, reception of them are waited in the step S301.

If "YES" in the step S301, the CPU of the server 102 stores the received unique ID and game ID in the memory area 404 and the memory area 406 of the RAM, respectively, in a step S303.

Succeedingly, in a step S305, the CPU of the server 102 determines whether or not data (encrypted random number and unique ID) is received. The aforementioned data is transmitted from the game apparatus 10 for authenticating the memory card 28 after first transmission of the unique ID, and thus, reception is waited in the step S305.

If "YES" in the step S305, the CPU of the server 102 decrypts the received data (encrypted random number and unique ID) with the key 1 corresponding to the unique ID in a step S307. More specifically, since the received data is encrypted with the key 1 by the memory controller 62 of the memory card 28, the CPU reads the keys 1, 2 and 3 corresponding to the first received unique ID of the memory area 404, and stores them in the memory area 408. Then, the received data is decrypted with the key 1. Thus, it is possible to acquire the random number and the unique ID, and store the acquired random number and unique ID in the memory area 410.

Then, in a step S309, the CPU of the server 102 determines whether or not the decrypted unique ID stored in the memory area 410 matches with the first unique ID stored in the memory area 404.

If "YES" in the step S309, that is, if the memory card 28 is identified as an authorized card, the CPU of the server 102 transmits the data indicating that the memory card 28 is the authorized card to the game apparatus 10 via the network 106 in a step S311. After completion of the step S311, the process proceeds to a step S315 in FIG. 28.

On the other hand, If "NO" in the step S309, that is, if the memory card 28 is not identified as an authorized card, the CPU of the server 102 transmits the data indicating that the memory card 28 is not the authorized card to the game apparatus 10 in a step S313. Then, the download processing is ended.

In the step S315 shown in FIG. 28, the CPU of the server 102 determines whether or not the block address is received. In response to the transmission in the step S311, the block address is transmitted from the game apparatus 10, and thus, the reception is waited in the step S315.

If "YES" in the step S315, the CPU of the server 102 stores the received block address in the memory area 412 in a step S317. Succeedingly, in a step S319, the CPU of the server 102 generates a dsCHG_MODE command by using the block address, the unique ID, and the random number. The dsCHG_MODE command is a transition command form making a transition to the download mode. In the dsCHG_MODE command, the block address is designated, and in the download mode, writing to the designated block address is made possible. Furthermore, in the dsCHG_MODE command, the random number and the unique ID of the memory area 410 are included.

Furthermore, in a step S321, the CPU of the server 102 encrypts the generated dsCHG_MODE command with the key 1 corresponding to the unique ID. Then, in a step S323, the CPU of the server 102 transmits the encrypted dsCHG_MODE command to the game apparatus 10.

Succeedingly, in a step S325, the CPU of the server 102 determines whether or not the data (encrypted random number and unique ID) is received from the game apparatus 10. When making a transition to the download mode, the memory controller 62 encrypts the random number and the unique ID with the key 2 and transmits the same to the server 102, and thus, the reception is waited in the step S325.

If "YES" in the step S325, that is, if the aforementioned data (encrypted random number and unique ID) is received, the CPU of the server 102 decrypts the received data (encrypted random number and unique ID) with the key 2 corresponding to the unique ID in a step S327. Thus, the random number and unique ID which are thus acquired are stored in the memory area 410. After completion of the step S327, the process proceeds to a step S329 in FIG. 29.

In the step S329 shown in FIG. 29, the CPU of the server 102 prepares a write file. More specifically, predetermined data is read from the data to be downloaded stored in the database, and stored in the memory area 414 of the RAM. The write file may be a file corresponding to the unique ID, a file corresponding to the game ID, or a predetermined file independent of the unique ID and the game ID, for example. In a step S331, the CPU of the server 102 transmits the file data amount of the write file to the game apparatus 10.

Succeedingly, in a step S333, the CPU of the server 102 fetches data of a predetermined size (2 kbytes in this embodiment) from the write file. The data of the write file is transmitted separately by the predetermined size.

In a step S335, the CPU of the server 102 calculates the MIC of 8 bytes with respect to the data of 2 kbytes with the key 3 corresponding to the unique ID. Here, as initial values for calculation of the MIC, the random number and the unique ID in the memory area 410 are used. In a succeeding step S337, the CPU of the server 102 adds the MIC of 8 bytes to the data of 2 kbytes. Then, in a step S339, the CPU of the server 102 encrypts the data of 2 kbytes+8 bytes with the key 2 corresponding to the unique ID. Here, as initial values for encryption, the unique ID and the random number of the memory area 410 are used. In a step S341, the CPU of the server 102 transmits the encrypted data of 2 kbytes+8 bytes to the game apparatus 10.

In a succeeding step S343, the CPU of the server 102 determines whether or not the file transmission is completed, or the transmission by one block is completed. Whether or not the file transmission is completed can be determined on the basis of the data amount of the write file and the cumulative amount of the data transmission. If "NO" in the step S343, that is, if the transmission by one block is not completed, or if the file transmission is not completed, the process returns to the step S333 to repeat the processing for transmitting the data of the predetermined size.

On the other hand, if "YES" in the step S343, the CPU of the server 102 determines whether or not the file transmission is completed in a step S345. If "NO" in the step S345, that is, if the data transmission in blocks is completed, but the transmission of all data of the write file is not completed, the process returns to the step S305 in FIG. 27. By repeating the processing from the download processing when the memory controller 62 in the game mode, writing of the data in the file to a next block is performed. On the other hand, if "YES" in the step S345, the writing of the data in the file is completed, so that the download processing is ended.

An operation of the backup processing by the game apparatus 10 as a security system with respect to the backup area is explained with reference to the flowcharts shown in FIG. 30 to FIG. 33.

Figure 30:
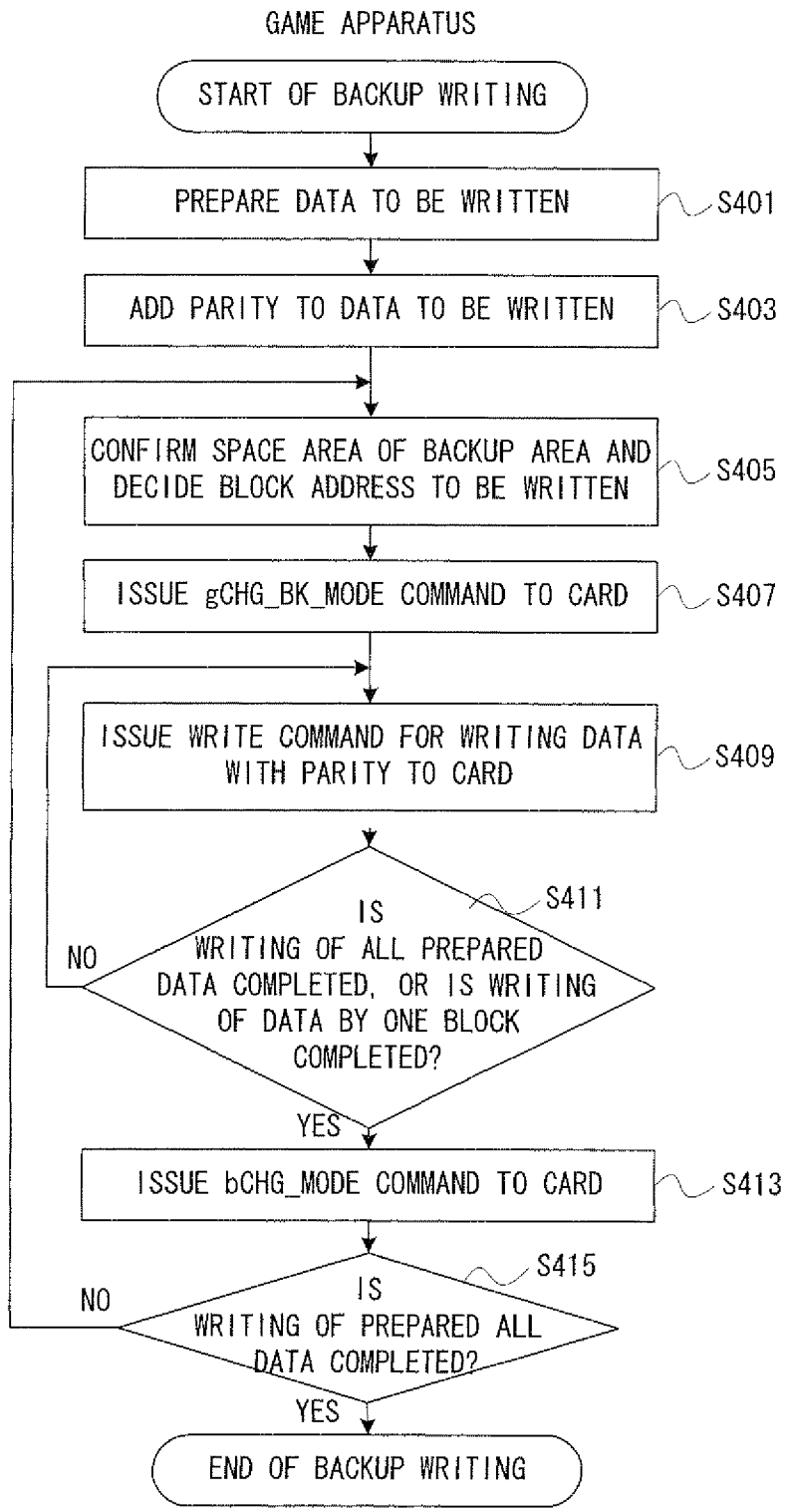
FIG. 30 is a flowchart showing one example of an operation of the game apparatus at a time of backup writing.

FIG. 30 shows one example of an operation of the game apparatus 10 in the backup writing processing. When writing to the backup area 206 is started, the CPU 34 prepares the data to be written in the RAM 42 in a step S401. The data to be written is backup data generated by the CPU 34 in the game processing, and stored in the memory area 510.

Next, in a step S403, the CPU 34 adds parity to the data to be written. As shown in FIG. 15, in this embodiment, data with parity is generated in a format in which each byte data is constructed of "data of seven bits"+a "parity bit (one bit)". That is, the first seven bits in each byte is the generated backup data, and the parity of the first 7 bits is added to the last bit. The generated data with parity is stored in the memory area 512.

Succeedingly, in a step S405, the CPU 34 confirms a space area of the backup area 206, and decides a block address to be written. Here, information about which area is used or about which area is a space area out of the memory area of the flash memory 64 is stored in the information area 200 as header information, for example, and thus, the CPU 34 generates management data of the flash memory 64 on the basis of the header information, ensures the space area in the backup area 206 based on the management data, and decides a block address to be written. The decided block address is stored in the memory area 514.

Then, in a step S407, the CPU 34 issues a gCHG_BK_MODE command to the memory card 28. The gCHG_BK_MODE command is a transition command for making a transition to the backup mode. In the transition command, the block address to be written is designated. Here, the memory controller 62 makes a transition to the backup mode in response to the transition command, and makes only the designated block readable out of the backup area 206.

In a succeeding step S409, the CPU 34 issues to the memory card 28 a write command for writing the data with parity. The write command includes the data with parity to be written. Similar to the above-described writing to the download area 204, data of a predetermined size is added to the write command such that the data is written by the predetermined size. In response to the write command, the memory controller 62 writes the data to the designated block of the backup area 206.

Then, in a step S411, the CPU 34 determines whether or not writing of all the prepared data is completed, or writing of the data by one block is completed. Here, whether or not writing of the prepared data (data with parity) is completed can be determined on the basis of the data amount of data with parity stored in the memory area 512 and the cumulative amount of data by the write command. If "NO" in the step S411, the process returns to the step S409 to repeat the writing by the write command.

On the other hand, if "YES" in the step S411, the CPU 34 issues a bCHG_MODE command to the memory card 28 in a step S413. The bCHG_MODE command is a transition command for making a transition from the backup mode to the game mode. Here, in response to the transition command, the memory controller 62 makes a transition to the game mode.

Then, in a step S415, the CPU 34 determines whether or not writing of all prepared data (data with parity) is completed. If "NO" in the step S45, that is, if writing data by one block is completed, but there is data with parity on which writing is not performed, the process returns to the step S405 to execute processing for writing as to the next block. On the other hand, if "YES" in the step S415, the backup writing processing is ended.

Figure 31:
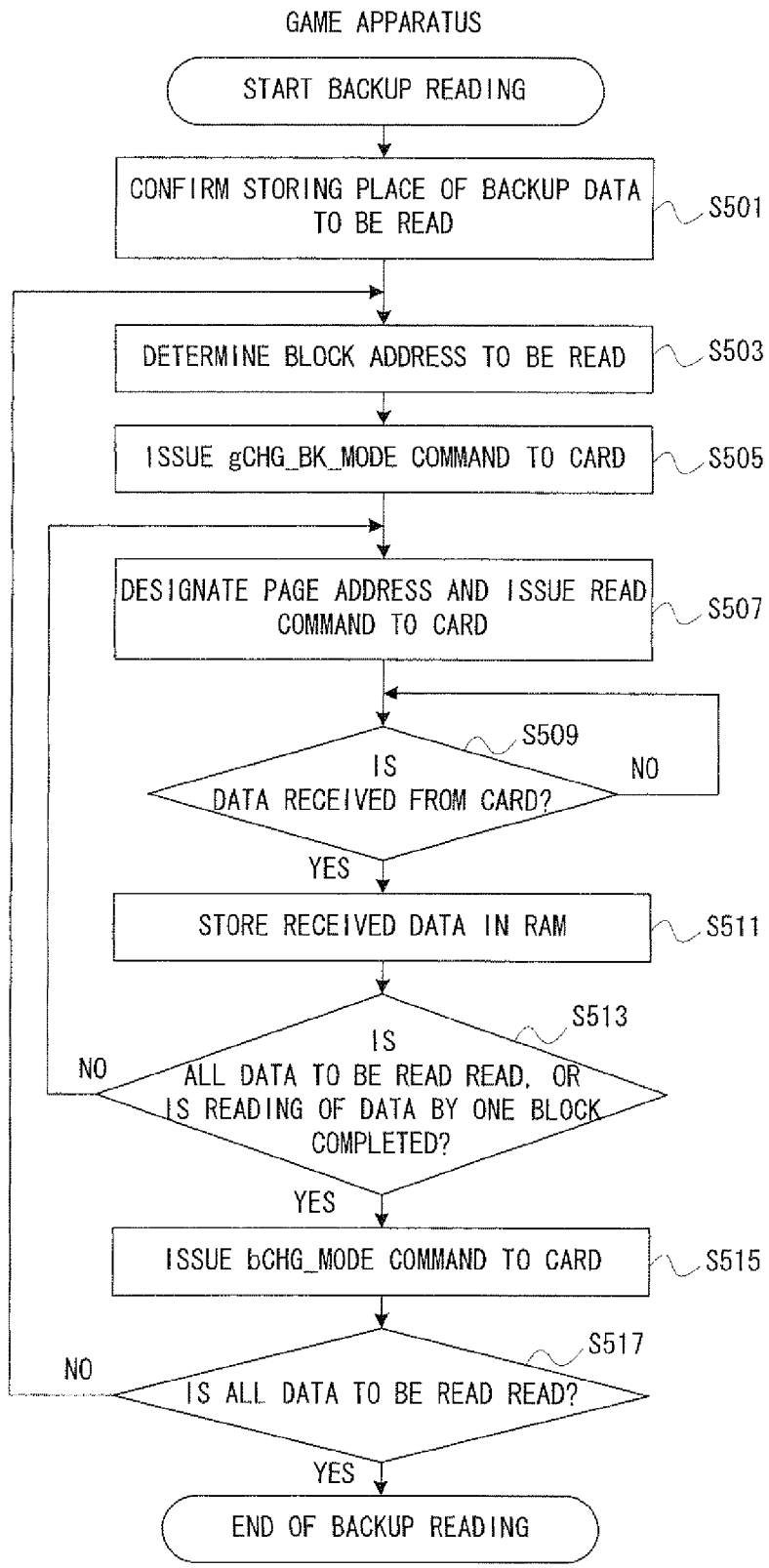
FIG. 31 is a flowchart showing one example of an operation of the game apparatus at a time of backup reading.

FIG. 31 shows one example of an operation of the game apparatus 10 in the backup reading processing. When reading processing from the backup area 206 is started, the CPU 34 confirms a storing location of the backup data to be read in a step S501. Here, the backup data to be read is selected according to an operation by the user or a program, etc. The information in relation to a storing place of each backup data is included in the header information of the flash memory 64, for example.

Next, in a step S503, the CPU 34 decides a block address to be read. The block address to be read is decided from the storing location of the backup data to be read, and stored in the memory area 516.

Succeedingly, in a step S505, the CPU 34 issues a gCHG_BK_MODE command to the memory card 28. The gCHG_BK_MODE command is a transition command for making a transition to the backup mode. In the transition command, the block address to be read which is decided in the step S503 is designated. In response to the transition command, the memory controller 62 makes a transition to the backup mode in which only the designated block is made accessible.

In a step S507, the CPU 34 designates a page address to be read and issues a read command to the memory card 28. The read command is a command for instructing the memory card 28 to read the data. For example, it is possible to instruct the memory card 28 to read the data on the designated page. Here, in response to the read command, the memory controller 62 reads the data on the designated page from the backup area 206. Then, if the read data is the authorized data, the data is output to the CPU 34.

In a step S509, the CPU 34 determines whether or not the data is received from the memory card 28. As described above, if the read data is the authorized one, the data is output, and thus, in the step S509, the reception is waited. Here, in a case that the read data by the memory controller 62 is the unauthorized one, a transition to the illegal mode is made to thereby output no data, and the backup reading processing is not operated normally.

If "YES" in the step S509, the CPU 34 stores the received data, that is, the read data in the memory area 518 of the RAM 42 in a step S511. Then, in a step S513, the CPU 34 determines whether all data to be read is read, or reading by one block is completed. Here, whether or not all data to be read is read can be determined on the basis of a data amount of the data to be read and a cumulative amount of the read data by the read command. If "NO" in the step S513, the process returns to the step S507 to repeat the reading processing by the read command.

On the other hand, if "YES" in the step S513, the CPU 34 issues a bCHG_MODE command to the memory card 28 in a step S515. The bCHG_MODE command is a transition command for making a transition to the game mode. In response to the transition command, the memory controller 62 makes a transition to the game mode.

Then, in a step S517, the CPU 34 determines whether or not all data to be read is read. If "NO" in the step S517, that is, if reading by one block is completed, but there is data to be read, the process returns to the step S503 to execute processing to read a next block. On the other hand, if "YES" in the step S517, the backup reading processing is ended.

Figure 32:
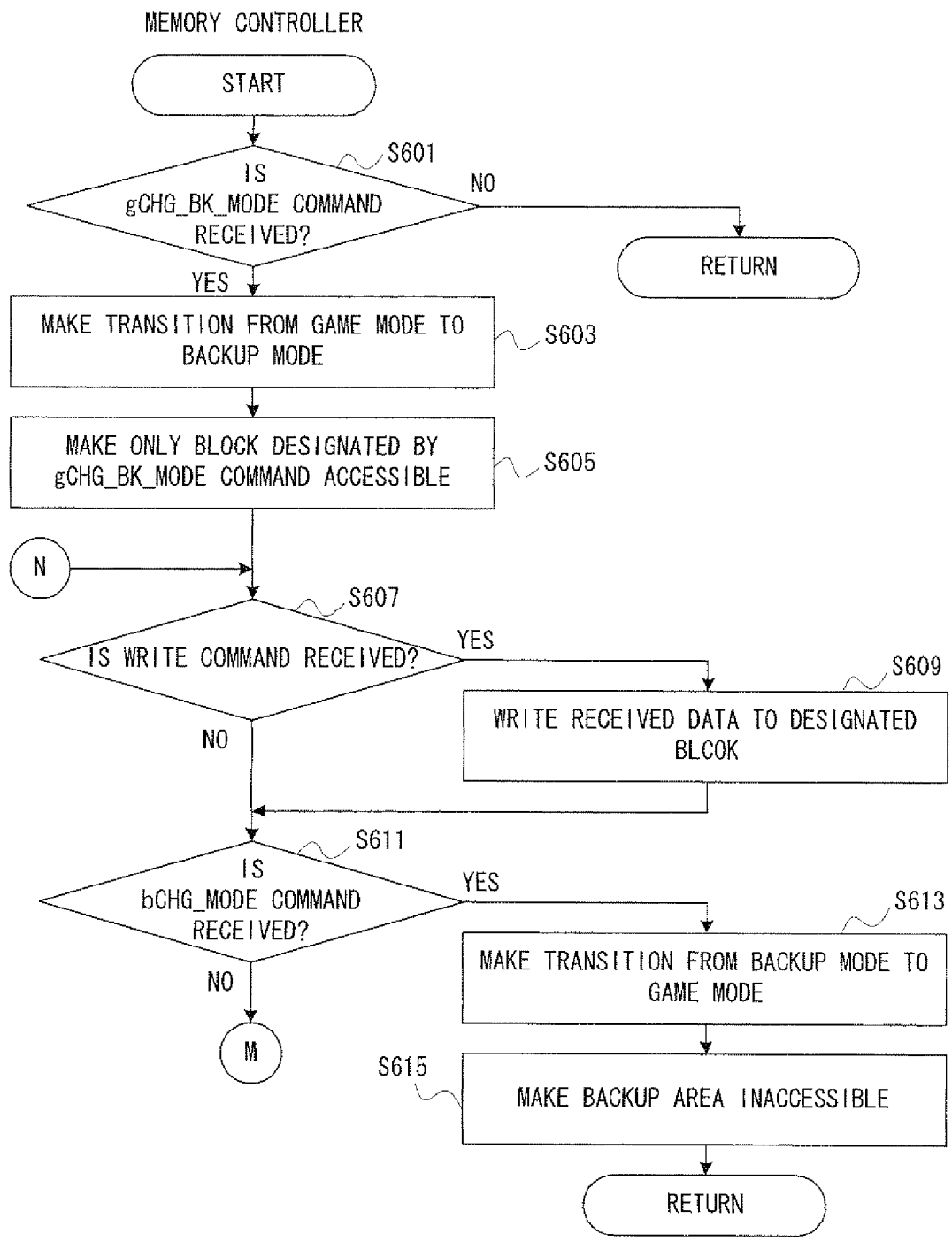
FIG. 32 is a flowchart showing a part of one example of an operation of the memory controller in a backup mode.
Figure 33:
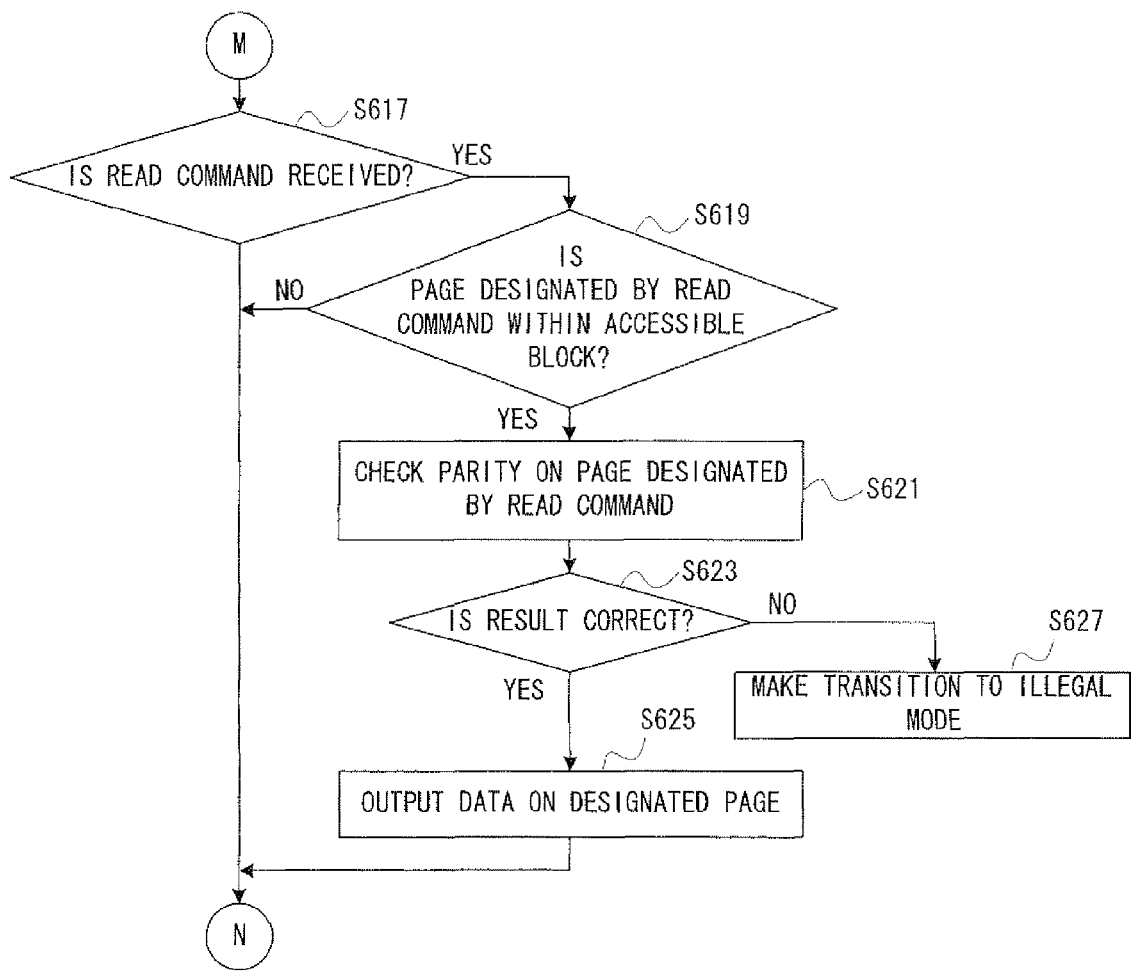
FIG. 33 is a flowchart showing a sequel to FIG. 32.

FIG. 32 and FIG. 33 show one example of an operation of the memory controller 62 in the backup processing. In a step S601 in FIG. 32, the memory controller 62 determines whether or not a gCHG_BK_MODE command is received. The gCHG_BK_MODE command is a transition command to the backup mode. If "NO" in the step S601, the backup processing is ended.

On the other hand, if "YES" in the step S601, the memory controller 62 makes a transition from the game mode to the backup mode in a step S603. In the mode memory area 300 of the internal RAM 66, data indicating the backup mode is stored. In a succeeding step S605, the memory controller 62 makes only the block designated by the gCHG_BK_MODE command out of the backup area 206 accessible. For example, the memory controller 62 stores the data indicating accessibility to each area of the flash memory 64 in the internal RAM 66, changes in the data the memory map of the download area to the designated block only, and sets the data indicating that access is made possible with respect to only the backup area.

Then, the memory controller 62 executes processing corresponding to the command received in the backup mode. That is, in a step S607, the memory controller 62 determines whether or not the write command is received. If "YES" in the step S607, the memory controller 62 writes the received data together with the write command in the block of the backup area 206 designated by the transition command in a step S609.

If the step S609 is ended, or if "NO" in the step S607, the memory controller 62 determines whether or not the bCHG_MODE command is received in a step S611. If "YES" in the step S611, that is, if the transition command to the game mode is received, the memory controller 62 makes a transition from the backup mode to the game mode in a step S613. In the mode memory area 300, data indicating the game mode is stored. Succeedingly, in a step S615, the memory controller 62 makes the backup area 206 inaccessible. For example, in the data indicating accessibility to each area of the flash memory 64, data indicating that the memory map of the backup area is returned to the original, and an access to the backup area 206 is made impossible is set. After completion of the step S615, the backup processing is ended.

On the other hand, if "NO" in the step S611, in a step S617 in FIG. 33, the memory controller 62 determines whether or not the read command is received. If "YES" in the step S617, the memory controller 62 determines whether or not the page designated by the read command is in the accessible block in a step S619. The accessible block is a block within the backup area 206 designated by the transition command to the backup mode. By the determination, it is possible to perform a parity check with respect to only the data on which a reading designation is properly performed, capable of eliminating an unauthorized reading command.

If "YES" in the step S619, the memory controller 62 checks the parity in the page designated by the read command in a step S621. More specifically, the memory controller 62 reads the designated page data in the work area of the internal RAM 66, calculates parity of the first 7 bits of each byte, and compares the calculation result with the last bit of each byte.

Then, in a step S623, the memory controller 62 determines whether or not the result of the parity check is correct. If "YES" in the step S623, that is, if the calculated parity bit and the last bit are equal to each other with respect to all the bytes, the memory controller 62 outputs the data in the designated page to the CPU 34 in a step S625.

On the other hand, if "NO" in the step S623, that is, if any byte for which the calculated parity bit and the last bit are not equal to each other is detected, the data to be read is identified as unauthorized data, and the memory controller 62 makes a transition to the illegal mode in a step S627. In the mode memory area 300, data indicating the illegal mode is stored. When a transition to the illegal mode is made, the memory controller 62 does not output the read data. Accordingly, it is possible to prevent the unauthorized data from being read and utilized.

Additionally, if "NO" in the step S617, if "NO" in the step S619, or if the step S625 is ended, the process returns to the step S607 in FIG. 32.

In the above-described embodiment, the download area 204 is provided to the flash memory 64 of the memory card 28 detachable to the game apparatus 10, but in another embodiment, the flash memory 64 is contained in the housing 16 of the game apparatus 10, and within the flash memory 64, the download area 204 may be provided. In this case, the memory controller 62 is also contained in the housing 16. Furthermore, the backup area 206 may be also provided in the flash memory 64 inside the housing 16 of the game apparatus 10. Here, in a case that the flash memory 64 is contained in the housing 16 of the game apparatus 10, the unique ID may be identification information of the game apparatus 10.

In each of the above-described embodiments, for making encryption for each memory card 28, the keys 1, 2 and 3 corresponding to the unique ID of the memory card 28 are prepared, and stored in the flash memory 64 and the server 12 in advance. However, in another embodiment, encryption may be made for each game title (game program) or each kind of the application (application program), and in such a case, keys 1, 2 and 3 corresponding to the game ID (application ID) are prepared and stored in the flash memory 64 and the server 12 in advance. Then, at a time of encryption or decryption, keys corresponding to the game ID are used.

Furthermore, in each of the above-described embodiment, two writing areas, such as the download area 204 and the backup area 206 are provided to the flash memory 64, and one of the download area 204 is protected stepwise by the mode transition and the encryption of the write data, and the other of the backup area 206 is protected by the format of the write data. However, in another embodiment, any one of the writing area only may be provided in the flash memory 64.

Although the present technology has been described and illustrated in detail, it is clearly understood that the same is by way of illustration and example only and is not to be taken by way of limitation, the spirit and scope of the present technology being limited only by the terms of the appended claims.

What is claimed is:

1. A writing area security system including a storage having a predetermined writing area, a controller controlling writing to and reading from said storage, and a host to be connected to said controller, wherein
said host includes an instruction transmitter which transmits a reading instruction of data stored in said predetermined writing area to said controller, and
said controller includes
a format determiner which determines whether or not the data read from said predetermined writing area in response to said reading instruction is in a predetermined format, and
an outputter which outputs said data to said host only when said format determiner determines that said data is in said predetermined format, wherein
said storage has a first area and a second area,
said controller further includes a first writer which writes data to said first area in a writable mode to which a transition is made in response to a first transition command issued by a server for downloading data to said host, and said format determiner determines only with respect to data read from said second area as said predetermined writing area whether or not said data is in the predetermined format, wherein
said server includes an encrypter which encrypts said first transition command.

2. The writing area security system according to claim 1, wherein
said controller further includes an address determiner which determines whether or not a reading address designated from said host is within an accessible area out of said predetermined writing area, and
when said address determiner determines that said reading address is within said accessible area out of said predetermined writing area, said format determiner determines whether or not the read data is in the predetermined format.

3. The writing area security system according to claim 1, wherein
said format determiner makes a determination by a parity check of said read data.

4. The writing area security system according to claim 1, wherein
said controller makes a transition to an illegal mode when said format determiner determines that said read data is not in said predetermined format.

5. The writing area security system according to claim 1, wherein
said host includes a writing data generator which generates data to which a parity bit is added, and
said controller includes a second writer which writes the data generated by said writing data generator in said predetermined writing area.

6. The writing area security system according to claim 1, wherein
said storage stores boundary data between said first area and said second area.

7. The writing area security system according to claim 1, wherein a server and an information processing apparatus for downloading data from said server are included,
said information processing apparatus includes said storage, said controller, and said host, said server includes
a transition command transmitter which transmits to said information processing apparatus said first transition command to cause said controller to make a transition to a writable mode to said first area of said storage, and
a data transmitter which transmits data to be downloaded to said information processing apparatus.

8. The writing area security system according to claim 7, wherein
said transition command transmitter transmits said first transition command encrypted by said encrypter, and
said controller further includes a decrypter which decrypts the encrypted first transition command.

9. The writing area security system according to claim 8, wherein
said controller decrypts the encrypted first transition command by said decrypter in a secure mode being higher in a degree of security than usual to which a transition has been made direct before said writable mode as to said first area.

10. The writing area security system according to claim 9, wherein
said storage stores the encrypted first key and second key, and said controller decrypts the encrypted first key and develops the same in a RAM when a transition to said secure mode is made, and decrypts the encrypted second key and develops the same in said RAM when a transition to said writable mode to said first area is made.

11. The writing area security system according to claim 10, wherein
said controller develops said first key in response to a second transition command for making a transition to said secure mode, and develops said second key in response to said first transition command.

12. The writing area security system according to claim 8, wherein
said server stores a first key for encrypting said first transition command, and a second key different from said first key for encrypting said data to be downloaded,
said encrypter encrypts said first transition command by utilizing said first key,
said data transmitter transmits the data to be downloaded encrypted by utilizing said second key,
said storage stores said first key and said second key,
said decrypter decrypts the encrypted first transition command by utilizing said first key, and
said first writer decrypts said encrypted data to be downloaded by utilizing said second key in the writable mode to said first area and writes the same to said first area.

13. The writing area security system according to claim 12, wherein
said server further stores a third key for message digest authentication of said data to be downloaded,
said data transmitter encrypts, by utilizing said second key, said data to be downloaded to which an authentication symbol generated by utilizing said third key is added, and transmits the encrypted data,
said storage further stores said third key,
said controller decrypts the encrypted data by utilizing said second key in said writable mode as to said first area, and
said first writer, when the decrypted data is authenticated by utilizing said third key, writes said data in said first area.

14. The writing area security system according to claim 13, wherein
said third key is a key obtained by a part of said second key being replaced.

15. The writing area security system according to claim 8, wherein
said storage stores identification information of said storage,
said information processing apparatus includes an identification information transmitter which transmits said identification information stored in said storage to said server,
said server stores a plurality of first keys for encrypting said first transition command, each of which is brought into correspondence with a respective one of said plurality of identification information, and
said encrypter encrypts said first transition command by utilizing said first key corresponding to the identification information of said storage.

16. The writing area security system according to claim 8, wherein
said storage stores identification information of an application program stored in said storage,
said information processing apparatus includes an identification information transmitter which transmits said identification information stored in said storage to said server, said server stores a plurality of first keys for encrypting said first transition command, each of which is brought into correspondence with a respective one of said plurality of identification information, and
said encrypter encrypts said first transition command by utilizing said first key corresponding to the received identification information of the application program.

17. The writing area security system according to claim 7, wherein
said first transition command includes an address designated for writing said data to be downloaded, and
said controller further includes a write enabler which makes only said designated address writable out of said first area when a transition is made to said writable mode as to said first area in response to said first transition command.

18. The writing area security system according to claim 17, wherein
said write enabler makes a fixed range from said designated address out of said first area writable.

19. The writing area security system according to claim 7, wherein
said host further includes a normal encrypter which performs an encryption according to an algorithm of a relatively low processing load on the command issued with respect to said in a normal mode.

20. The writing area security system according to claim 7, wherein
said host further includes a write command issuer which issues a writing command to instruct said controller to perform writing, and
said controller writes said data to be downloaded to said first area in response to said writing command in said writable mode to said first area.

21. The writing area security system according to claim 1, wherein
said storage and said controller are provided to a detachable storage medium.

22. A memory controller utilized in a writing area security system including a storage having a predetermined writing area and a host, said host including one or more computer processors, and controlling writing to and reading from said storage, comprising:
a format determiner which determines, via said one or more computer processors, whether or not data read from said predetermined writing area in response to a reading instruction from said host is in a predetermined format, and
an outputter which outputs said data to said host only when said format determiner determines that said data is in said predetermined format, wherein
said storage has a first area and a second area,
said controller further includes a first writer which writes data to said first area in a writable mode to which a transition is made in response to a first transition command issued by a server for downloading data to said host, and
said format determiner determines only with respect to data read from said second area as said predetermined writing area whether or not said data is in the predetermined format, wherein
said server includes an encrypter which encrypts said first transition command.

23. A security method in a writing area security system including a storage having a predetermined writing area, a controller which controls writing to and reading from said storage, and a host to be connected to said controller, including:
- determining whether or not data read from said predetermined writing area in response to a reading instruction from said host by said controller is in a predetermined format, and
- outputting said data to said host by said controller only when it is determined that said data is in the predetermined format, wherein
- said storage has a first area and a second area,
- said controller further includes a first writer which writes data to said first area in a writable mode to which a transition is made in response to a first transition command issued by a server for downloading data to said host, and
- said format determiner determines only with respect to data read from said second area as said predetermined writing area whether or not said data is in the predetermined format, wherein
- said server includes an encrypter which encrypts said first transition command.

* * * * *